United States Patent
Kasama et al.

(10) Patent No.: US 7,301,888 B2
(45) Date of Patent: Nov. 27, 2007

(54) RECORDING APPARATUS

(75) Inventors: Nobuyuki Kasama, Chiba (JP); Norio Chiba, Chiba (JP); Yasuyuki Mitsuoka, Chiba (JP); Manabu Oumi, Chiba (JP); Kenji Kato, Chiba (JP); Takashi Niwa, Chiba (JP); Kunio Nakajima, Chiba (JP)

(73) Assignee: Seiko Instruments Inc. (JP)

( * ) Notice: Subject to any disclaimer, the term of this patent is extended or adjusted under 35 U.S.C. 154(b) by 116 days.

(21) Appl. No.: 11/340,010

(22) Filed: Jan. 24, 2006

(65) Prior Publication Data

US 2006/0120228 A1 Jun. 8, 2006

Related U.S. Application Data

(62) Division of application No. 10/950,119, filed on Sep. 24, 2004, now Pat. No. 7,042,829, which is a division of application No. 10/674,088, filed on Sep. 29, 2003, now Pat. No. 6,914,873, which is a division of application No. 10/199,870, filed on Jul. 19, 2002, now Pat. No. 6,754,163, which is a division of application No. 09/423,848, filed on Feb. 20, 2001, now Pat. No. 6,466,537.

(30) Foreign Application Priority Data

| Mar. 20, 1998 | (JP) | ................................. 10-072786 |
| Oct. 13, 1998 | (JP) | ................................. 10-291142 |
| Oct. 23, 1998 | (JP) | ................................. 10-302266 |
| Jan. 25, 1999 | (JP) | ................................. 11-016202 |

(51) Int. Cl.
*G11B 7/00* (2006.01)

(52) U.S. Cl. ........................ 369/126; 369/118

(58) Field of Classification Search ............. 369/126, 369/118, 119, 44-37
See application file for complete search history.

(56) References Cited

U.S. PATENT DOCUMENTS

| 5,392,173 A | 2/1995 | Kinoshita et al. ............. 360/75 |
| 5,577,016 A | 11/1996 | Inagaki et al. ............... 369/110 |
| 5,712,842 A | 1/1998 | Yamamoto et al. ......... 369/112 |
| 6,563,782 B1 * | 5/2003 | Oumi et al. ................ 369/126 |

FOREIGN PATENT DOCUMENTS

| EP | 0517270 | 12/1992 |
| EP | 0535611 | 4/1993 |

(Continued)

*Primary Examiner*—Nabil Hindi
(74) *Attorney, Agent, or Firm*—Adams & Wilks

(57) ABSTRACT

In a recording apparatus for reproducing information recorded on a recording medium by utilizing near-field light, the recording apparatus realizes reliable information reproduction with a simple structure. Illumination light 20 is illuminated to the recording medium 10 to create near-field light on a surface of the recording medium 10. The created near-field light is scattered by a microscopic aperture 12 formed in the aperture element 11 so that scattering light (propagation light) thereof is detected to create a reproduced signal. Derived from the created reproduced light a distance control signal representative of a distance between the microscopic aperture 12 and the recording medium 10. Based on the distance control signal, the aperture element 11 is controlled in position. Due to this, the microscopic aperture 12 is brought into proximity to the recording medium 10.

12 Claims, 20 Drawing Sheets

FOREIGN PATENT DOCUMENTS

| | | |
|---|---|---|
| EP | 0587459 | 3/1994 |
| EP | 0622652 | 11/1994 |
| EP | 0791802 | 8/1997 |
| EP | 0871006 | 10/1998 |
| JP | 07021564 | 1/1995 |
| WO | 9503561 | 2/1995 |

* cited by examiner

RECORDING APPARATUS

CROSS REFERENCE TO RELATED APPLICATIONS

The present application is a division of application Ser. No. 10/950,119, filed Sep. 24, 2004 now U.S. Pat. No. 7,042,829, which is a division of application Ser. No. 10/674,088, filed Sep. 29, 2003 (now U.S. Pat. No. 6,914,873, issued Jul. 5, 2005), which is a division of application Ser. No. 10/199,870 filed Jul. 19, 2002 (now U.S. Pat. No. 6,754,163, issued Jun. 22, 2004), which is a division of application Ser. No. 09/423,848 filed Feb. 20, 2001 (now U.S. Pat. No. 6,466,537, issued Oct. 15, 2002), all of which are hereby incorporated by reference, and priority thereto for common subject matter is hereby claimed.

TECHNICAL FIELD

The present invention relates to a recording apparatus for reproducing information recorded with density on a recording medium by utilizing near-field light.

BACKGROUND OF THE INVENTION

In many of the existing information reproducing apparatuses, reproduction is being made of information recorded on a read-only optical disc such as CDs and CD-ROMs. For example the CD on its surface is recorded, as concave-and-convex formed information, with pits having a size nearly a wavelength of laser light to be used during reproduction and a depth of about one-fourth of that wavelength. The phenomenon of light interference is utilized in reproducing information.

Meanwhile, on the market are rewritable recording mediums adopting a scheme represented by a magneto-optical recording scheme and phase shift recording scheme, realizing high density information recording. For example, in the phase change recording scheme, laser light is illuminated to a recording medium formed on a surface with a phase change film to cause temperature at a laser light illumination spot. By changing the intensity of laser light, binary recording due to crystalline and amorphous forms has been feasible. The information thus recorded is reproduced by illuminating laser light to the recording medium with intensity lower than that of recording and distinguishing between a crystallization phase and an amorphous phase due to the intensity of its reflection.

In reproducing information recorded on the read-only optical disc, a lens optical system is used which has being employed for the conventional optical microscope. Due to limitation by light diffraction, it is impossible to reduce the spot size of laser light less than a half wavelength. Consequently, in the case of further increasing the information recording density of the optical disc, the pit size or track pitch is reduced and hence the information recording unit is reduced to a smaller size than the laser light wavelength. Thus, information reproduction is not feasible.

Meanwhile, in a recording medium recorded with information by the magneto-optical recording scheme and phase change recording scheme, information recording/reproduction with density is realized due to microscopic spot of laser light. Accordingly, the information recording density on the recording medium is limited to the spot size obtainable by focusing laser light. Accordingly, in the conventional optical information recording apparatus adopting a magneto-optical recording scheme and phase change recording scheme, it has been impossible to reduce the spot size obtained by focusing laser light to smaller than a laser light diffraction limit, i.e. a half wavelength of laser light.

On the other hand, there is a proposal of an information reproducing method/apparatus utilizing near-field light created through a microscopic aperture having a diameter smaller than a wavelength of utilized laser light, e.g. approximately $\frac{1}{10}$th of the wavelength.

Conventionally, as an apparatus utilizing near-field light there has been a near-field microscope employing a microscopic aperture as above, being utilized for observing a microscopic surface structure of a sample. As one of near-field light utilizing schemes for the near-field microscope, there is a scheme (illumination mode) that the distance between a probe microscopic aperture and a sample surface is brought close to nearly a diameter of the probe microscopic aperture so that propagation light is introduced through the probe and directed to the probe microscopic aperture, thereby creating near-field light in the microscopic aperture. In this case, the created near-field light and the sample surface interact with to cause scattering light to be detected by a scattering light detecting system, accompanied by an intensity or phase reflecting a sample surface fine structure. Thus, observation is possible with high resolution not realizable by the conventional optical microscope.

Meanwhile, as another scheme of a near-field microscope utilizing near-field light, there is a scheme (collection mode) that propagation light is illuminated to a sample to localize near-field light on a sample surface whereby the probe microscopic aperture is brought close to the sample surface nearly to an extent of a diameter of the probe microscopic aperture. In this case, the localized near-field light and the probe microscopic aperture interact to cause scattering light to be introduced to a scattering light detecting system through the probe microscopic aperture, accompanied by an intensity or phase reflecting a sample surface fine structure. Thus, high resolution observation is realized.

The information reproducing method/apparatus utilizing near-field light as mentioned above utilizes these observation schemes for the near-field microscope.

Accordingly, the utilization of near-field light makes possible information reproduction (reading) from the information recording medium recorded exceeding the recording density on the conventional information recording medium.

In the meanwhile, in order to realize reproduction of information recorded on the recording medium through utilizing near-field light mentioned above, there is a necessity for probe proximity control technology to bring a probe microscopic aperture portion as an optical head and a surface of the recording medium to a fully-close distance of from several nano-meters to 10 nano-meters.

In the conventional hard disc technologies, there is a flying head technology to bring a recording head and a recording medium close to each other. The float amount of the flying head from a recording medium surface is about from 50 nano-meters to 100 nano-meters, which value is too great to realize information reproduction utilizing near-field light.

On the other hand, the scanning probe microscopes (SPM) represented by the scanning tunnel microscope (STM) or atomic force microscope (AFM) are used in order to observe nano-meter order microscopic regions on sample surfaces. The SPM uses a tip sharpened probe to detect a physical amount, such as a tunneling current or inter-atomic force caused between the probe and the sample surface, whereby scanning is made on the sample surface in proximity to the sample surface to obtain high resolution image.

Accordingly, this SPM probe proximity technology is applicable to a near-field microscope or a recording apparatus utilizing near-field light. Thus, the recording medium and the probe microscopic aperture at its tip can be kept in a fully closed state.

In this case, however, there arises a need to detect by respective unique mechanisms a physical amount replaced by information recorded on the recording medium, or near-field light, and a physical amount required to effect proximity control of the probe, or inter-atomic force, making complicated the overall apparatus structure.

Also, because the SPM probe proximity technology requires a sharpened tip for the probe, it is not necessarily an optimal method for the near-field microscopes using a flat-surface probe without having a sharpened tip or the recording apparatuses utilizing near-field light.

Meanwhile, near-field light mentioned above abruptly attenuates in a z direction provided that a line connecting between the probe and the recording medium is defined as a z direction. Accordingly, the probe if deviates in position in the z direction from the recording medium surface due to a certain cause, this induces a variation in the output signal. The presence or absence of a data mark on the recording medium increases and decreases the output signal. Thus, there has been a problem that, when there is a change in the output signal, it cannot be reliably determined whether the change is due to the presence of the data mark or due to deviation in probe position in the z direction.

There is a method for controlling the probe z-direction position by mechanically vibrating the probe in the z direction to keep the amplitude constant. However, this result in giving a physical impact to the recording medium surface, incurring damage to the recording medium and probe. Meanwhile, there has been difficulty in reducing apparatus size due to probe vibration control and amplitude detecting mechanism.

Therefore, it is an object of the present invention to provide in view of the above-stated problems a recording apparatus to realize, with a simple structure, reproducing and recording information reliably for a recording medium having high density record.

DISCLOSURE OF THE INVENTION

In order to achieve the above object, a recording apparatus according to the present invention is, in a recording apparatus for reproducing or recording information recorded on a recording medium by utilizing near-field light, the recording apparatus, characterized in that: light is illuminated to the recording medium to create near-field light on a surface of the recording medium, and a probe having a microscopic aperture being brought into proximity to the surface of the recording medium; an intensity of propagation light being detected to control a distance between the microscopic aperture and the recording medium based on the intensity of the propagation light.

Accordingly, achieved is reproduction of high density information recorded on a recording medium by utilizing near-field light. Simultaneously, similarly utilizing near-field light, control is possible for a distance between the microscopic aperture of the aperture element and the recording medium.

Also, a recording apparatus according to the invention is, in a recording apparatus for reproducing information recorded on a recording medium by utilizing near-field light, the recording apparatus, comprising: an aperture element having a microscopic aperture to create or scatter near-field light; a light illuminating means for illuminating illumination light to the recording medium such that near-field light is created on a surface of the recording medium; a light detecting means for detecting propagation light caused by scattering the near-field light by the microscopic aperture to turning this into a reproduced signal; a control means for controlling a spacing between the aperture element and the recording medium based on the reproduced signal.

Accordingly, achieved is reproduction of high density information recorded on a recording medium by utilizing near-field light. Simultaneously, from the reproduced signal a distance control signal representative of a distance between the microscopic aperture of the aperture element and the recording medium can be obtained by the distance control signal deriving means. Based on the distance control signal, the aperture element and the recording medium can be held in a proximity state.

Also, a recording apparatus according to the invention is, in a recording apparatus for reproducing or recording information recorded on a recording medium by utilizing near-field light, the recording apparatus, comprising: an aperture element having a microscopic aperture to create or scatter near-field light; a light illuminating/recording means for introducing illumination light to the microscopic aperture such that near-field light is created in the microscopic aperture; a light detecting means for detecting propagation light caused by scattering the near-field light by the recording medium to turning this into a reproduced signal; a control means for controlling a spacing between the aperture element and the recording medium based on the reproduced signal.

Accordingly, reproduction of high density information recorded on the recording medium and holding the aperture element and the recording medium in a proximity state can be made both by utilizing near-field light. Also, by comparatively increasing the intensity of illumination light introduced to the microscopic aperture, intense near-field light can be created. Localized thermal energy illumination makes possible also information recording.

Also, a recording apparatus according to the invention is, in a recording apparatus for reproducing information recorded on a recording medium by utilizing near-field light, the recording apparatus, comprising: an aperture element having a microscopic aperture to create or scatter near-field light; a light illuminating means for illuminating illumination light having a definite wavelength width or a plurality of wavelengths to the recording medium such that near-field light is created on a surface of the recording medium; a scattering light detecting means for detecting scattering light caused as a result of interaction of the near-field light with the recording medium or the aperture element correspondingly to the wavelength of the illumination light; a control means for controlling a spacing between the aperture element and the recording medium based on the scattering light.

Accordingly, reproduction of high density information recorded on the recording medium and holding the aperture element and the recording medium in a proximity state can be made both by utilizing near-field light. Furthermore, it is possible to positively separate a reproduced signal and a distance control signal for performing proximity control on the aperture element, by utilizing and assigning different wavelengths respectively to the illumination light used to reproducing information recorded on the reproducing medium and the illumination light used to perform proximity control on the aperture element. Also, because scattering light is detected correspondingly to different wavelengths of illumination light, distance information about the reproduce probe and information recording medium is obtained by utilizing the difference of scattering light intensity in dependence upon the illumination light wavelength. Information reproduction and control of the probe in the z-axis direction position can be made without vibration of the probe in the z-axis direction. This makes unnecessary the probe z-direction vibration mechanism and z-axis amplitude detecting mechanism, making possible simple apparatus structure. Also, distance control makes unnecessary the detection of a signal peak. Also, because there is no physical contact of the probe with the information recording medium, reduced is damage to the probe and information recording medium.

Also, a recording apparatus according to the invention is, in a recording apparatus for reproducing or recording information recorded on a recording medium by utilizing near-field light, the recording apparatus, comprising: an aperture element having a microscopic aperture to create or scatter near-field light; a light illuminating/recording means for illuminating illumination light having a definite wavelength width or a plurality of wavelengths to the microscopic aperture such that near-field light is created in the microscopic aperture, and recording information to the recording medium through illumination light having one of the plurality of wavelengths; a scattering light detecting means for detecting scattering light caused as a result of interaction of the near-field light with the recording medium or the aperture element correspondingly to the wavelength of the illumination light; a control means for controlling a spacing between the aperture element and the recording medium based on the scattering light.

Accordingly, reproduction of high density information recorded on the recording medium and holding the aperture element and the recording medium in a proximity state can be made both by utilizing near-field light. Further, it is possible to positively separate a reproduced signal and a distance control signal for performing proximity control on the aperture element, by utilizing and assigning different wavelengths respectively to the illumination light used to reproducing information recorded on the reproducing medium and the illumination light used to perform proximity control on the aperture element. Also, by comparatively increasing the intensity of illumination light introduced to the microscopic aperture, intense near-field light can be created. Localized thermal energy illumination makes possible also information recording.

Furthermore, in the recording apparatus according to the invention, the plurality of wavelengths of the illumination light are switched in time.

Accordingly, compact apparatus structure is feasible due to emitting a plurality of wavelengths of light by the single light source.

Furthermore, in the recording apparatus according to the invention, the scattering light detecting means has a selection wavelength to be switched in time.

Accordingly, a compact apparatus structure is achieved due to receiving the scattering light by the single light receiving element.

Furthermore, in the recording apparatus according to the invention, the wavelength of the illumination light is plural in number and is inputted simultaneously.

Accordingly, a further compact apparatus structure is achieved because a mechanism to select an input light wavelength is not necessary.

Furthermore, in the recording apparatus according to the invention, the scattering light detecting means has a plurality of light receiving means for receiving respective ones of different wavelengths of the illumination light.

Accordingly, the wavelength selecting means is simplified and hence compact apparatus structure is feasible, because the unnecessity of switching in time between selective wavelengths when the light receiving element receives scattering light.

Furthermore, in the recording apparatus according to the invention, the illumination light comprises a plurality of wavelength components and has a definite wavelength width with respect to respective ones of the plurality of wavelengths.

Accordingly, because the input means allows the input light wavelength to have a width, the types of input means which can be utilized is increased. This makes it easy to utilize a wavelength for accurately controlling the distance between the probe and the information recording medium.

Furthermore, in the recording apparatus according to the invention, the illumination light has a wavelength having a definite width, a wavelength selecting means selecting one part of the width.

Accordingly, a simpler structure is realized because the input light is not limited in wavelength, such as with a laser.

Also, a recording apparatus according to the invention is, in a recording apparatus for reproducing information recorded on a recording medium by utilizing near-field light, the recording apparatus, comprising: an aperture element having a microscopic aperture to create or scatter near-field light; a light illuminating means for illuminating illumination light mixed with two different modulation frequency light to the recording medium such that near-field light is created on a surface of the recording medium; a first light detecting means for scattering the created near-field light by the microscopic aperture and detecting propagation light having one of the two modulation frequencies, turning this into a reproduced signal; a second light detecting means for scattering the created near-field light by the microscopic aperture and detecting propagation light having the other of the two modulation frequencies, turning this into a control signal; a control means for controlling a spacing between the aperture element and the recording medium based on the control signal.

Accordingly, reproduction of high density information recorded on the recording medium and holding the aperture element and the recording medium can be held in a proximity state both by utilizing near-field light. Furthermore, it is possible to positively separate a reproduced signal and a distance control signal for performing proximity control on the aperture element, by utilizing and assigning different wavelengths respectively to the illumination light used to reproducing information recorded on the reproducing medium and the illumination light used to perform proximity control on the aperture element.

Also, a recording apparatus according to the invention is, in a recording apparatus for reproducing or recording information recorded on a recording medium by utilizing near-field light, the recording apparatus, comprising: an aperture element having a microscopic aperture to create or scatter near-field light; a light illuminating/recording means for illuminating illumination light mixed with two different modulation frequencies to the microscopic aperture to create near-field light in the microscopic aperture, and recording information to the recording medium through illumination light having one of at least the two modulation frequencies; a first light detecting means for scattering the created near-field light by the microscopic aperture and detecting propagation light having one of the two modulation frequencies, turning this into a reproduced signal; a second light detecting means for scattering the created near-field light by the microscopic aperture and detecting propagation light having the other of the two modulation frequencies, turning this into a control signal; a control means for controlling a spacing between the aperture element and the recording medium based on the control signal.

Accordingly, reproduction of high density information recorded on the recording medium and holding the aperture element and the recording medium in a proximity state can be made both by utilizing near-field light. Furthermore, it is possible to positively separate a reproduced signal and a distance control signal for performing proximity control on the aperture element, by utilizing and assigning different wavelengths respectively to the illumination light used to reproducing information recorded on the reproducing medium and the illumination light used to perform proximity control on the aperture element. Also, by comparatively increasing the intensity of illumination light introduced to the microscopic aperture, intense near-field light can be created. Localized thermal energy illumination makes possible also information recording.

Also, a recording apparatus according to the invention is, in a recording apparatus for reproducing or recording information recorded on a recording medium by utilizing near-field light, the recording apparatus, comprising: an aperture element having two microscopic apertures to create or scatter near-field light; a light illuminating means for illuminating illumination light to the recording medium such that near-field light is created on a surface of the recording medium; a first light detecting means for detecting propagation light caused by scattering the near-field light by one of the microscopic apertures, turning this into a reproduced signal; a second light detecting means for detecting propagation light caused by scattering the near-field light by the other of the microscopic apertures, turning this into a control signal; a control means for controlling a spacing between the aperture element and the recording medium based on the control signal.

Accordingly, reproduction of high density information recorded on the recording medium and holding the aperture element and the recording medium in a proximity state can be made both by utilizing near-field light. Furthermore, because the aperture element is formed independently with a microscopic aperture used to reproduce information recorded on the recording medium and a microscopic aperture used to perform proximity control of the aperture element, it is more positively separate a reproduced signal and a distance control signal for performing proximity control of the aperture element.

Also, a recording apparatus according to the invention is, in a recording apparatus for reproducing or recording information recorded on a recording medium by utilizing near-field light, the recording apparatus, comprising: an aperture element having two microscopic apertures to create or scatter near-field light; a first light illuminating means for illuminating illumination light to the recording medium such that near-field light is created on a surface of the recording medium; a second light illuminating/recording means for illuminating illumination light to one of the microscopic apertures such that near-field light is created in the microscopic aperture; a first light detecting means for detecting propagation light caused by scattering the near-field light by one of the microscopic apertures, turning this into a reproduced signal; a second light detecting means for detecting propagation light caused by scattering the near-field light by the other of the microscopic apertures, turning this into a control signal; a control means for controlling a spacing between the aperture element and the recording medium based on the control signal.

Accordingly, reproduction of high density information recorded on the recording medium and holding the aperture element and the recording medium in a proximity state can be made both by utilizing near-field light. Furthermore, because the aperture element is formed independently with a microscopic aperture used to reproduce information recorded on the recording medium and a microscopic aperture used to perform proximity control of the aperture element, it is more positively separate a reproduced signal and a distance control signal for performing proximity control of the aperture element. Furthermore, by comparatively increasing the intensity of illumination light introduced to the microscopic aperture by the second light illuminating means, intense near-field light can be created. Localized thermal energy illumination makes possible also information recording.

Also, a recording apparatus according to the invention is, in a recording apparatus for reproducing or recording information recorded on a recording medium by utilizing near-field light, the recording apparatus, comprising: an aperture element having two microscopic apertures to create or scatter near-field light; a light illuminating/recording means for introducing illumination light to one of the microscopic apertures such that near-field light is created in the microscopic aperture; a light illuminating means for introducing illumination light to the other of the microscopic apertures such that near-field light is created in the microscopic aperture; a first light detecting means for detecting propagation light caused by scattering the near-field light by one of the microscopic apertures, turning this into a reproduced signal; a second light detecting means for detecting propagation light caused by scattering the near-field light by the other of the microscopic apertures, turning this into a control signal; a control means for controlling a spacing between the aperture element and the recording medium based on the control signal.

Accordingly, reproduction of high density information recorded on the recording medium and holding the aperture element and the recording medium in a proximity state can be made both by utilizing near-field light. Furthermore, because the aperture element is formed independently with a microscopic aperture used to reproduce information recorded on the recording medium and a microscopic aperture used to perform proximity control of the aperture element, it is more positively separate a reproduced signal and a distance control signal for performing proximity control of the aperture element. Furthermore, by comparatively increasing the intensity of illumination light introduced to the microscopic aperture, intense near-field light can be created. Localized thermal energy illumination makes possible also information recording.

Also, a recording apparatus according to the invention is, in a recording apparatus for reproducing or recording information recorded on a recording medium by utilizing near-field light, the recording apparatus, comprising: an aperture element having two microscopic apertures to create or scatter near-field light; a light illuminating/recording means for introducing illumination light to one of the microscopic apertures such that near-field light is created in the microscopic aperture; a light illuminating means for illuminating illumination light to the other of the microscopic apertures such that near-field light is created in the microscopic aperture; a first light detecting means for detecting propagation light caused by scattering the near-field light by one of the microscopic apertures, turning this into a reproduced signal; a second light detecting means for detecting propagation light caused by scattering the near-field light by the other of the microscopic apertures, turning this into a control signal; a control means for controlling a spacing between the aperture element and the recording medium based on the control signal.

Accordingly, reproduction of high density information recorded on the recording medium and holding the aperture element and the recording medium in a proximity state can be made both by utilizing near-field light. Furthermore, because the aperture element is formed independently with a microscopic aperture used to reproduce information recorded on the recording medium and a microscopic aperture used to perform proximity control of the aperture element and further near-field light is formed by different creating methods that is utilized for reproducing information recorded on the recording medium and proximity control of the aperture element to the recording medium, it is more positively separate and detect a reproduced signal and a distance control signal for performing proximity control of the aperture element without interference between the respective ones of near-field light. Furthermore, by comparatively increasing the intensity of illumination light introduced to the microscopic aperture, intense near-field light can be created. Localized thermal energy illumination makes possible also information recording.

Furthermore, in the recording apparatus according to the invention, the aperture element is provided with a step in a thickness direction to have a first bottom surface and a second bottom surface, the first bottom surface being provided with the one of microscopic apertures, the second bottom surface being provided with the other of microscopic apertures; the control means calculating a relative value of the reproduced signal detected by the first light detecting means and the signal detected by the second light detecting means, and controlling the spacing between the aperture element and the recording medium based on the relative value.

Accordingly, the provision of a step in the bottom surface of the aperture element causes difference in intensity of propagation light to be detected. A relative value of between signals to be detected by the respective two microscopic apertures is used as a distance control signal for performing proximity control of the aperture element. Accordingly, even where for example the information on the recording medium cannot be fully detected and hence an intense reproduced signal cannot be obtained, the distance control signal is used as a ratio to the reproduced signal to thereby stably obtain an intensity. Thus, reliable proximity control of the aperture element can be made.

Also, a recording apparatus of the invention is, in a recording apparatus for reproducing information recorded on a recording medium by utilizing near-field light, the recording apparatus, comprising: an aperture element having a microscopic aperture to create or scatter near-field light; a light illuminating means for illuminating illumination light to the recording medium such that near-field light is created on a surface of the recording medium; a light detecting means for detecting propagation light caused by scattering the near-field light by the microscopic aperture; a vertical fine vibrating means for causing the microscopic aperture in a thickness direction of the aperture element; a control means for rendering as a reproduced signal a signal detected by the light detecting means when the microscopic aperture reaches a desired height due to the vertical fine vibrating means and as a to-be-operated signal a signal detected by the light detecting means when the microscopic aperture reaches a point above the desired height due to the vertical fine vibrating means, and calculating a relative value of the reproduced signal and the to-be-operated signal to control a spacing between the aperture element and the recording medium based on the relative value.

Accordingly, the vertical vibration of one microscopic aperture changes a position scattering near-field light. Because a relative value of a signal to be detected at a desired height of the microscopic aperture, i.e. reproduced signal, and a signal to be detected at an above point than the desired height of the microscopic aperture, i.e. to-be-detected signal, is used as a distance control signal. Accordingly, even where for example the information on the recording medium cannot be fully detected and hence an intense reproduced signal cannot be obtained, the distance control signal is used as a ratio to the reproduced signal to thereby stably obtain an intensity. Thus, reliable proximity control of the aperture element can be made.

Also, a recording apparatus according to the invention is, in a recording apparatus for reproducing or recording information recorded on a recording medium by utilizing near-field light, the recording apparatus, comprising: an aperture element having a microscopic aperture to create or scatter near-field light; a light illuminating/recording means for introducing illumination light to the microscopic aperture such that near-field light is created in the microscopic aperture; a light detecting means for detecting propagation light caused by scattering the near-field light by the microscopic aperture; a vertical fine vibrating means for causing the microscopic aperture in a thickness direction of the aperture element; a control means for rendering as a reproduced signal a signal detected by the light detecting means when the microscopic aperture reaches a desired height due to the vertical fine vibrating means and as a to-be-operated signal a signal detected by the light detecting means when the microscopic aperture reaches a point above the desired height due to the vertical fine vibrating means, and calculating a relative value of the reproduced signal and the to-be-operated signal to control a spacing between the aperture element and the recording medium based on the relative value.

Accordingly, the vertical vibration of one microscopic aperture changes a position scattering near-field light. Because a relative value of a signal to be detected at a desired height of the microscopic aperture, i.e. reproduced signal, and a signal to be detected at an above point than the desired height of the microscopic aperture, i.e. to-be-detected signal, is used as a distance control signal. Accordingly, even where for example the information on the recording medium cannot be fully detected and hence an intense reproduced signal cannot be obtained, the distance control signal is used as a ratio to the reproduced signal to thereby stably obtain an intensity. Thus, reliable proximity control of the aperture element can be made. Furthermore, by comparatively increasing the intensity of illumination light introduced to the microscopic aperture, intense near-field light can be created. Localized thermal energy illumination makes possible also information recording.

Furthermore, the recording apparatus according to the invention, further comprises horizontal fine vibrating means for causing the aperture element to finely vibrate in a direction perpendicular to a direction of arrangement of information units recorded on the recording medium and a direction parallel with a surface of the recording medium, and a position control means for controlling a position of the aperture element such that the reproduced signal becomes a maximum in a vibration center of fine vibration due to the horizontal fine vibrating means.

Accordingly, made possible is position control in a direction perpendicular to a direction of arranging information units on the recording medium and parallel with the recording medium surface, i.e. tracking control. Because this tracking control provides a stable reproduced signal, proximity control utilizing this reproduced signal is also positive, thus improving reliability of information reproduction.

BEST MODE FOR PRACTICING THE INVENTION

Embodiments of recording apparatuses according to the present invention will be explained below in detail based on the drawings.

EMBODIMENT 1

Figure 1:
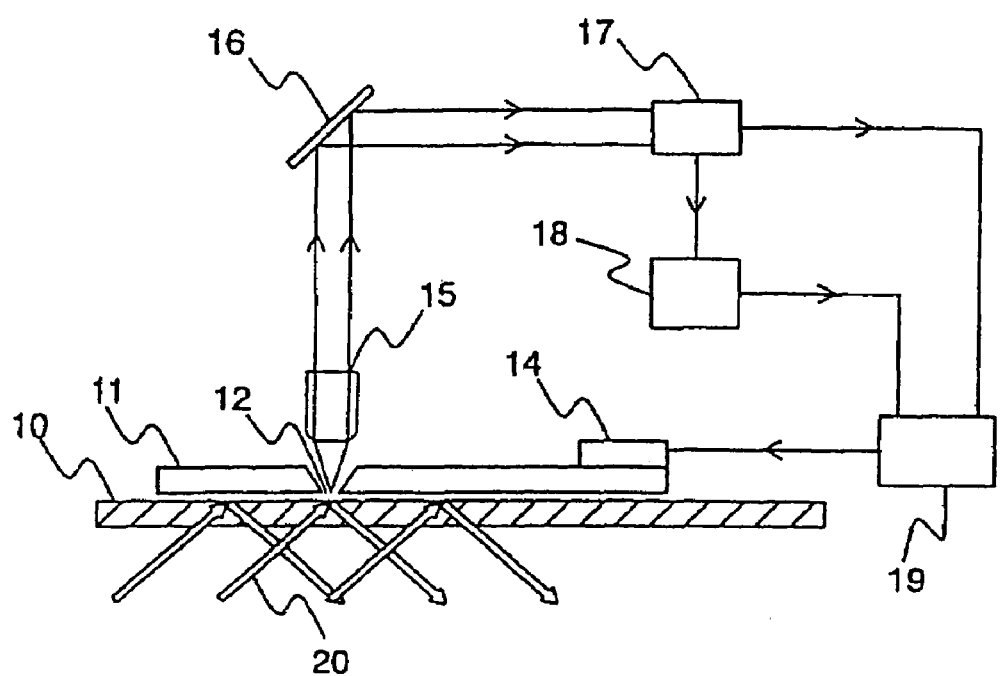
FIG. 1 is a block diagram showing a schematic structure of a recording apparatus according to Embodiment 1 of the present invention.

FIG. 1 is a block diagram showing a schematic structure of a recording apparatus according to Embodiment 1.

An aperture element 11 is a flat-surface substrate formed, for example, of a silicon substrate, through which an inverted conical hole is formed to have its apex providing for a microscopic aperture 12. The microscopic aperture 12 is of a size suited for create or scatter near-field light, and has a diameter, for example, of several tens of nano-meters. Further, a Z-axis control mechanism 14 is provided on the aperture element 11 to control the microscopic aperture 12 in proximity to a recording medium 10. The Z-axis control mechanism 14 is of a fine displacing mechanism, such as a piezoelectric actuator or electrostatic actuator.

Figure 2:
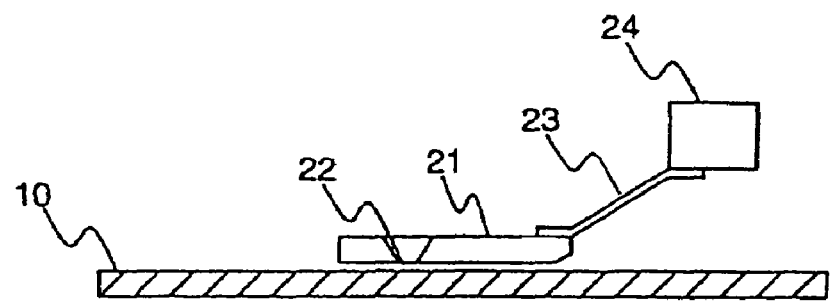
FIG. 2 is a view showing another example of a Z-axis control mechanism in a recording apparatus according to the invention.

Meanwhile, the Z-axis control mechanism 14 may be a control mechanism applied with a flying head structure as shown in FIG. 2. In FIG. 2, the aperture element 21 serves also as a slider for a flying head technique and is formed with a microscopic aperture 22 similar to the above microscopic aperture 12. Further, the aperture element 21 is held by a spring mechanism 23 and urged onto a surface of a recording medium 10 through elasticity of the spring mechanism 23. The spring mechanism 23 is connected to a spring control mechanism 24. The spring control mechanism 24 can cause a support portion of the spring mechanism 23 on a spring control mechanism 24 side to displace in height. This displacement control makes possible proximity control of the aperture element 21 to the recording medium 10.

In FIG. 1, in order to reproduce information recorded on the recording medium 10 by utilizing near-field light, first there is a necessity of controlling the aperture element 11 in a vertical direction to a surface of the recording medium 10 such that the microscopic aperture 12 is brought into full proximity to the surface of the recording medium 10. Near-field light is utilized as a physical quantity to be detected for proximity control, similarly to a physical quantity to be detected for information reproduction.

Laser light 20 is illuminated directed from a back side of the recording medium 10 to the surface of the recording medium 10, preferably under a total reflection condition to the backside of the recording medium 10. Due to this, near-field light is created and localized in the surface of the recording medium 10. The aperture element 11 is brought into proximity to the recording medium 10 such that the microscopic aperture 12 is positioned in a region of the localized near-field light. In this case, the Z-axis control mechanism 14 provided on the aperture element 11 is a mechanism to control a fine displacement of the aperture element 11. Accordingly, a control mechanism, such as an inch worm motor, may be added to implement control of the aperture element 11 over a comparatively large distance of from a distance that the aperture element 11 is fully distant from the recording medium 10 to a distance that raises requirement to control by a Z-axis control mechanism 14.

When the microscopic aperture 12 is inserted in the localized near-field light region on the recording medium 10, the near-field light is scattered by the microscopic aperture 12. The scattered light (propagation light) is introduced through the microscopic aperture 12 to a focusing optical system 15 placed above the microscopic aperture 12. Thus, detection of near-field light is achieved in a collection mode as stated before. The propagation light introduced to the focusing optical system 15 is introduced through a mirror 16 to a light detecting mechanism 17 and converted into an electric signal to be processed into a reproduced signal. Here, the focusing optical system 15 is, for example, a lens optical system, optical fiber optical system or light guide or the like. Also, the light detecting mechanism 17 is, for example, a multiplier phototube, photodiode or the like. The reproduced signal outputted from the light detecting mechanism 17 is sent to a control mechanism 19 and to a peak detecting mechanism 18. The peak detecting mechanism 18 derives a maximum value in intensity of the reproduced signals within a predetermined signal detection time or a predetermined number of times of sampling, i.e. a peak signal, and sends the peak signal to the control mechanism 19. The data mark or a gap length between data marks is defined of its upper and lower limits, typically approximately 8 times a minimum unit length. If the time for which the peak detecting mechanism 18 detects a signal is set to a time required for scanning over an upper limit of the data mark length by a probe, it is possible to detect a data mark within a signal detection time without fail. The control mechanism 19 transmits a control signal to the Z-axis control mechanism 14 in order to control the microscopic aperture 12 such that a value represented by a peak signal is held that is transmitted from the peak detecting mechanism 18, thus controlling the position of the aperture element 11. Also, in the control mechanism 19 determination is made on a recording condition of information in a reproduce position where the microscopic aperture 12 is positioned, due to the reproduced signal directly received from the light detecting mechanism 17, thus achieving information reproduction.

Accordingly, it is possible for the high density information recorded on the recording medium 10 to be achieved of reproduction utilizing near-field light. At the same time, the peak signal detecting mechanism 18 can process the reproduced signal as a distance signal representative of a distance between the microscopic aperture 12 of the aperture element 11 and the recording medium 10. Based on the distance signal, the aperture element 11 and the recording medium 10 can be held in a proximity state. By using in this manner near-field light for physical quantities to be detected both in information reproduction and microscopic aperture 12 proximity control, a probe proximity control mechanism as conventionally required in a recording apparatus utilizing near-field light is excluded which utilizes other physical quantity than near-field light. Thus, the recording apparatus can be simplified in structure. Furthermore, it is possible to provide for a recording apparatus which uses a reproducing probe (flat-surface probe) without having a sharpened tip as explained above.

Figure 3:
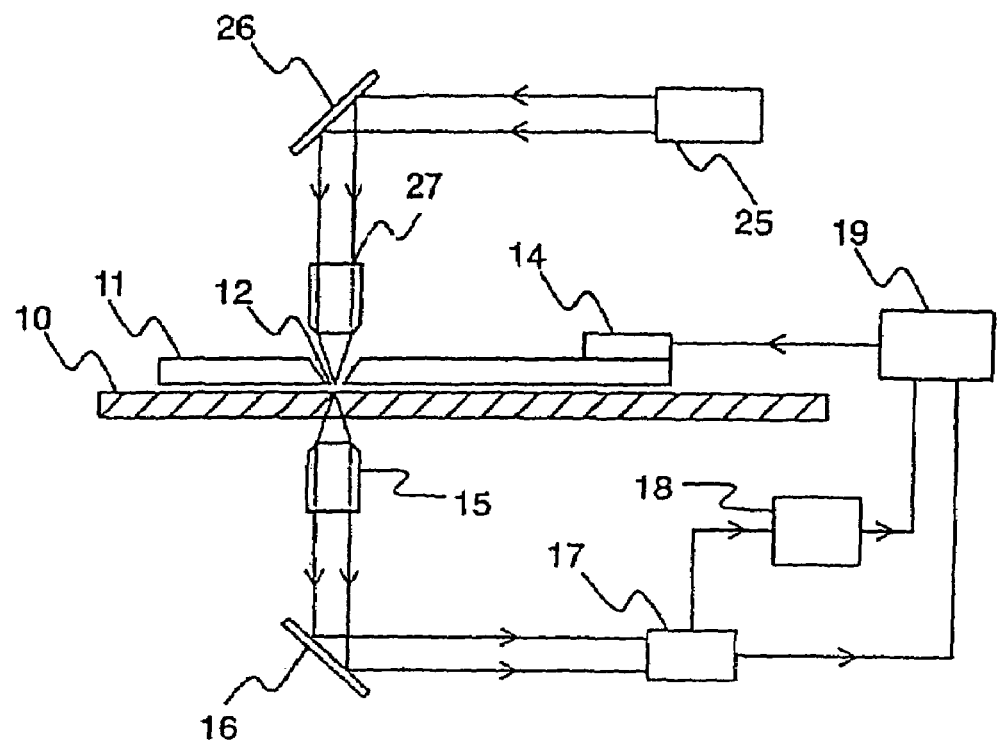
FIG. 3 is a block diagram showing a modification to the recording apparatus according to Embodiment 1 of the invention.

FIG. 3 is a block diagram showing, in the recording apparatus explained in FIG. 1, a schematic structure of the recording apparatus in a case of detecting near-field light in the afore-said illumination mode. Incidentally, the parts common to those of FIG. 1 are attached by the same reference characters.

In FIG. 3, the laser light emitted from a laser light source 25 is introduced through the mirror 26 to the light illumination optical system 27, and illuminated directed to the microscopic aperture 12 through the inverted conical hole in the aperture element 11. Due to this, near-field light is created in the microscopic aperture 12. The aperture element 11 is brought into proximity to the recording medium 10 such that the surface of the recording medium 10 is positioned in a region of the created near-field light.

If the near-field light created by the microscopic aperture 12 reaches the surface of the recording medium 10, the near-field light is scattered by a fine structure on the surface of the recording medium 10. The scattered light (propagation light) is introduced to the focusing optical system 15 arranged on the back side of the recording medium 10. Thus, detection of the near-field light is achieved in the afore-said illumination mode. The propagation light introduced into the focusing optical system 15 is introduced to the light detecting mechanism 17 through the mirror 16 arranged on the back side of the recording medium 10 and converted into an electric signal to be turned into a reproduced light. The reproduced light outputted from the light detecting mechanism 17 is transmitted to the control mechanism 19 and sent to the peak detecting mechanism 18. The control mechanism 19 sends a control signal to the Z-axis control mechanism 14 based on a peak signal sent from the peak detecting mechanism 18, as explained in FIG. 1, to conduct position control for the aperture element 11. Based on the reproduced signal received from the light detecting mechanism 17, determination is made on a recording state of information in a reproducing position that the microscopic aperture 12 is arranged.

Consequenty, it is possible to reproduce the high density information recorded on the recording medium 10 and hold a proximity state for the aperture element 11 and the recording medium 10, both through utilization of near-field light. Thus, the recording apparatus is simplified in structure. Further, a reproducing probe (flat-surface probe) without having a sharpened tip can be used in a recording apparatus. Also, because the illumination mode is adopted for detecting near-field light, the comparatively increased intensity of laser light to be introduced to the microscopic aperture makes possible to create intense near-field light, enabling localized thermal energy illumination. Therefore, besides reproduction of information recorded high in density, recording information with density is possible due to providing thermal energy.

EMBODIMENT 2

Figure 4:
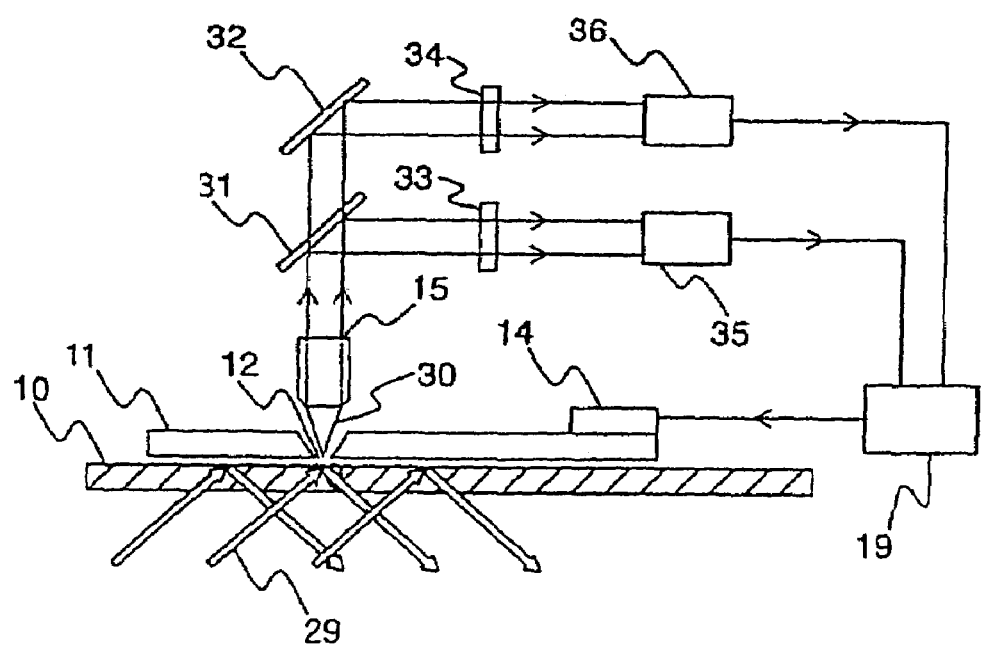
FIG. 4 is a block diagram showing a schematic structure of a recording apparatus according to Embodiment 2 of the invention.

FIG. 4 is a block diagram showing a schematic structure of a recording apparatus according to Embodiment 2. Incidentally, the parts common to those of FIG. 1 are attached by the same reference characters.

In FIG. 4, laser light 29 is illuminated directed from a back side of the recording medium 10 to the surface of the recording medium 10, preferably under a total reflection condition to the backside of the recording medium 10. Due to this, near-field light is created and localized in the surface of the recording medium 10. The aperture element 11 is brought into proximity to the recording medium 10 such that the microscopic aperture 12 is positioned in a region of the localized near-field light. Here, the laser light 29 is light having two different wavelengths from each other, i.e. mixed with information reproducing laser light (wavelength $\lambda 1$) and distance controlling laser light (wavelength $\lambda 2$). The near-field light localized on the surface of the recording medium 10 includes two wavelength different from each other.

When the microscopic aperture 12 is inserted in the localized near-field light region on the recording medium 10, the near-field light is scattered by the microscopic aperture 12. The scattered light (propagation light) is introduced through the microscopic aperture 12 to a focusing optical system 15 placed above the microscopic aperture 12. Thus, detection of near-field light is achieved in the collection mode. The propagation light introduced to the focusing optical system 15 contains two different wavelength components ($\lambda 1$ and $\lambda 2$) similarly to the scattered near-field light, which is separated of wavelength through a dichroic mirror 31. One (wavelength of $\lambda 1$) of the propagation light wavelength-separated by the dichroic mirror 31 is introduced to the light detecting mechanism 36 through a transmission mirror 32 and optical filter 34, while the other (wavelength of $\lambda 2$) is reflected and then introduced through an optical filter 33 to a light detecting mechanism 35. Here, the optical filter 34 is a filter to select and transmit through a wavelength $\lambda 1$ of propagation light, while the optical filter 33 is to select and transmit through a wavelength $\lambda 2$ of propagation light. The propagation light introduced to the light detecting mechanism 36 is converted to an electric signal to be turned into a reproduced signal, while the propagation light introduced to the light detecting mechanism 35 is converted into an electric signal to be turned into a distance control signal. Both are sent to the control mechanism 19. The control mechanism 19 sends a control signal to the Z-axis control mechanism 14 in order to control the position of the microscopic aperture 12 in a manner of holding a value represented by a distance control signal sent from the light detecting mechanism 35, thus effecting position control for the aperture element 11. It is also possible to incorporate a peak detecting mechanism to hold a detected peak value, similarly to Embodiment 1. Also, in the control mechanism 19 determination is made on a recording state of information in a reproducing position that the microscopic aperture 12 is arranged, based on a reproduced signal sent from the light detecting mechanism 36, thus achieving information reproduction.

Therefore, it is possible to reproduce high density information recorded on the recording medium 10 and hold the aperture element 11 and the recording medium 10 in a proximity state, both by the utilization of near-field light. Thus, the recording apparatus is simplified in structure. Furthermore, a reproducing probe (flat-surface probe) without having sharpened tip can be used in the recording apparatus. Furthermore, it is possible to carry out information reproduction and aperture element proximity control with positiveness and reliability, by assigning and utilizing different wavelengths to laser light to be used for reproducing information recorded on the recording medium (information reproducing laser light) and laser light to be used for effecting proximity control for the aperture element (distance control laser light).

Figure 5:
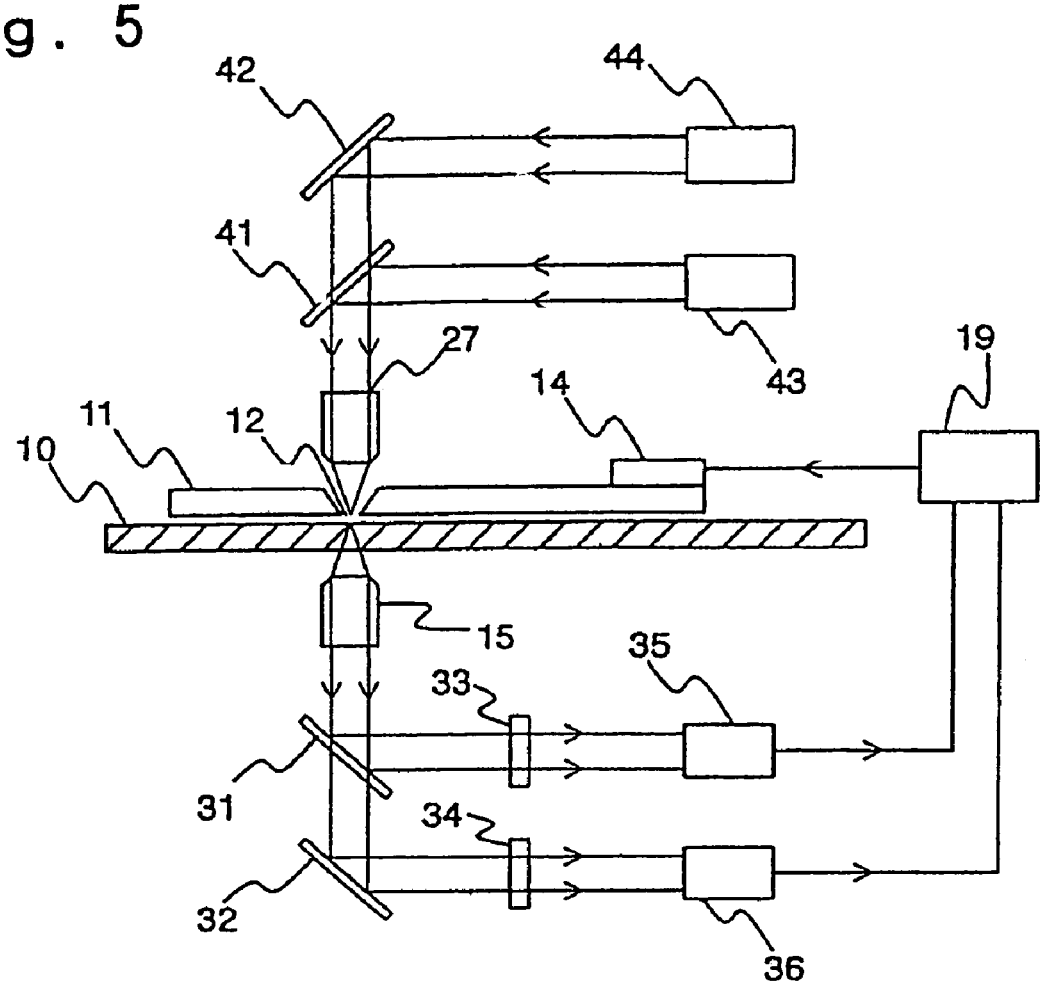
FIG. 5 is a block diagram showing a modification to the recording apparatus according to Embodiment 2 of the invention.

FIG. 5 is a block diagram showing, in the recording apparatus explained in FIG. 4, a schematic structure of a recording apparatus in a case of detecting near-field light in an illumination mode. Incidentally, the parts common to those of FIG. 4 are attached with same reference characters. In FIG. 5, information reproducing laser light (wavelength of $\lambda 1$) as explained in FIG. 4 is emitted from a laser light source 44, and introduced through a mirror 42 to a wavelength combiner 41. Also, distance control laser light (wavelength of $\lambda 2$) as explained in FIG. 4 is emitted from a laser light source 43, and introduced to the wavelength combiner 41. The information reproducing laser light and distance control laser light introduced to the wavelength combiner 41 are combined together and introduced to a light illumination optical system 27 where it is illuminated directed to the microscopic aperture 12 through the inverted conical hole of the aperture element 11. Due to this, near-field light is created in the microscopic aperture 12. The aperture element 11 is brought into proximity to the recording medium 10 such that the surface of the recording medium 10 is positioned within a region of the created near-field light. Here, the near-field light created in the microscopic aperture 12 contains two different wavelength components ($\lambda 1$ and $\lambda 2$).

If the near-field light created in the microscopic aperture 12 reaches the surface of the recording medium 10, the near-field light is scattered by a fine structure in the surface of the recording medium 10. The scattered light (propagation light) is introduced and focused to the focusing optical system 15 arranged on the back side of the recording medium 10. Thus, detection of near-field light is achieved in the illumination mode. The propagation light introduced to the focusing optical system 15 contains the afore-said two different wavelength components ($\lambda 1$ and $\lambda 2$), which is separated of wavelength through a dichroic mirror 31. The processing of propagation light through the dichroic mirror 31, i.e. creation of a reproduced signal and distance control signal as well as proximity control depending on the distance control signal, is similar to the operation given in FIG. 4 and explanation thereof is omitted herein.

Therefore, it is possible to reproduce high density information recorded on the recording medium 10 and hold the aperture element 11 and the recording medium 10 in a proximity state, both by the utilization of near-field light. Thus, the recording apparatus is simplified in structure. Furthermore, a reproducing probe (flat-surface probe) without having sharpened tip can be used in the recording apparatus. Furthermore, it is possible to carry out information reproduction and aperture element proximity control with positiveness and reliability, by assigning and utilizing different wavelengths to laser light to be used for reproducing information recorded on the recording medium (information reproducing laser light) and laser light to be used for effecting proximity control for the aperture element (distance control laser light). Also, because the illumination mode is adopted for detecting near-field light, the comparatively increased intensity of laser light to be introduced to the microscopic aperture makes possible to create intense near-field light, enabling localized thermal energy illumination. Therefore, besides reproduction of information recorded high in density, recording information with density is possible due to providing thermal energy.

EMBODIMENT 3

Figure 6:
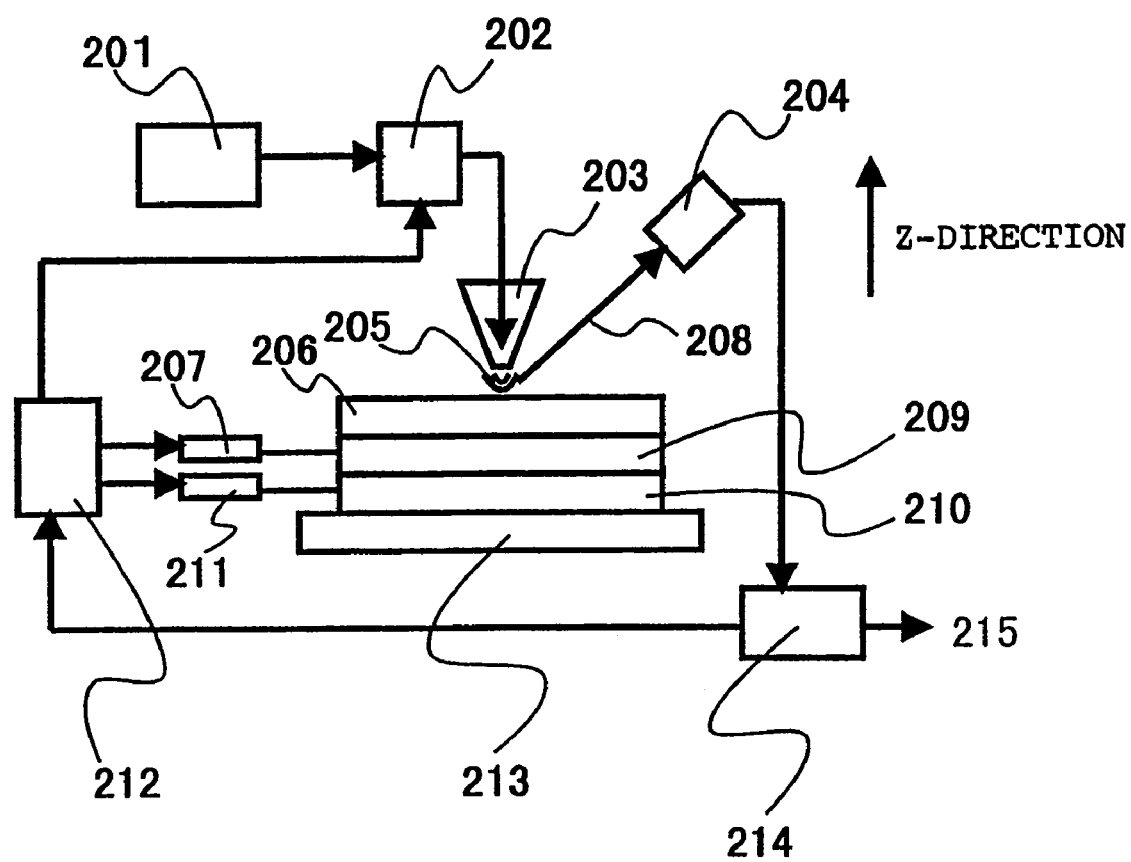
FIG. 6 is a block diagram showing a schematic structure of a recording apparatus according to Embodiment 3 of the invention.

FIG. 6 is a block diagram showing a schematic structure of an information reproducing apparatus according to Embodiment 3 of the invention. A laser light source 201 is for example an Ar gas laser to emit wavelengths of 488 nm and 515 nm of light. The light is selected of wavelength by an acoustic filter 202 and introduced to a near-field optical probe 203. The acoustic optical filter 202 is structured by a quartz crystal and an acoustic wave driver (not shown), and has an function to separate single color light from broad band light. The travel of an acoustic wave through the crystal causes distortion in the crystal lattice, which serves alike a grating. The acoustic filter has a function close to a transmission type filter. The selection wave can be narrowed in half-amplitude level down to an order of 1 nm. The near-field optical probe 203 is formed at its tip with a microscopic aperture of approximately 100 nm. In the present embodiment the near-field optical probe 203 is made by heating, extending, cutting and then Al-coating an optical fiber. This is the same as a method that is generally known as a conventional method of making a near-field optical probe for a near-field optical microscope. The near-field optical probe 203 is in proximity of several tens of nm to a surface of an information recording medium 206. Near-field light 205 is produced through a microscopic aperture at a tip of the near-field optical probe 203. This is scattered by the surface of the information recording medium 206 and turned into propagatable scattered light 208 to be detected by a light receiving element 204. Due to the use of the probe with such a microscopic aperture, the interacting light with the recording medium can have a principal component of near-field light. The detected signal is due to near-field light. The detected signal is sent to a signal processing circuit 214. The signal processing circuit 214 outputs an output signal 215 and a signal sent to a control circuit 212. The control circuit 212 controls the operation of the acoustic optical filter 202, and outputs signals to actuators 207, 211 whereby a rough movement mechanism 210 and fine movement mechanism 209 controls the recording medium 206 in a z-direction.

Figure 7:
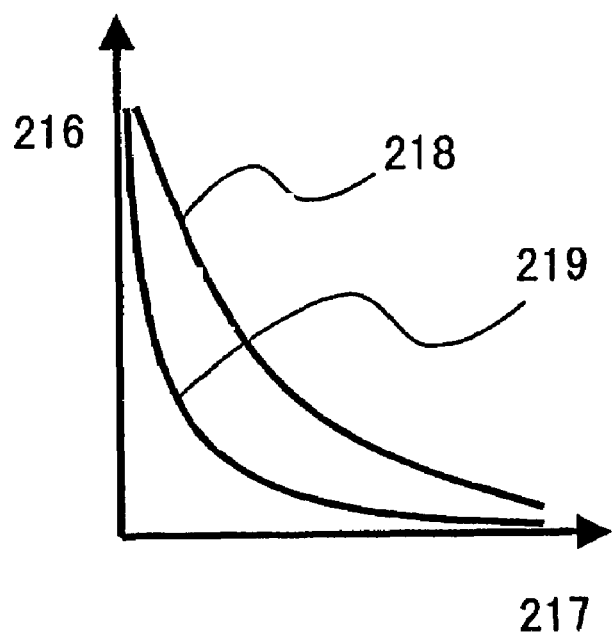
FIG. 7 is a figure showing a dependency of near-field intensity to a distance between a probe and a recording medium surface.

The acoustic filter 202 can switch between two wavelength of $\lambda_1$=488 nm and $\lambda_2$=515 nm at a speed of 250 micro-second. Due to this, the near-field optical probe 203 is introduced alternately in time by two wavelengths of 488 nm and 515 nm of light. Near-field light 205 has a z-direction dependency of exponential function attenuation. However, because the exponential portion differs depending on a wavelength, the near-field light when having $\lambda_2$ as an input light wavelength has distribution spread far. FIG. 7 shows a dependency of a near-field light intensity against a distance between the probe and the recording medium surface. In FIG. 7, the near-field light intensity represented by the vertical axis abruptly attenuates as the distance between the probe and the recording medium surface increases. The inclination of attenuation depends on the wavelength.

Figure 8:
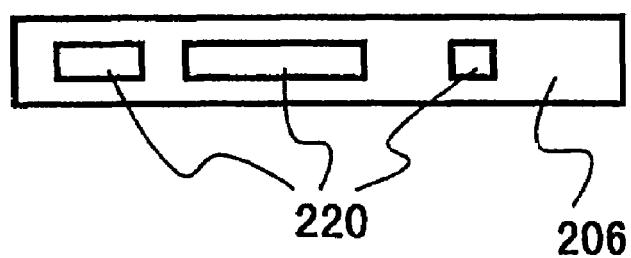
FIG. 8 is a top view of one part of an information recording medium 206.
Figure 9:
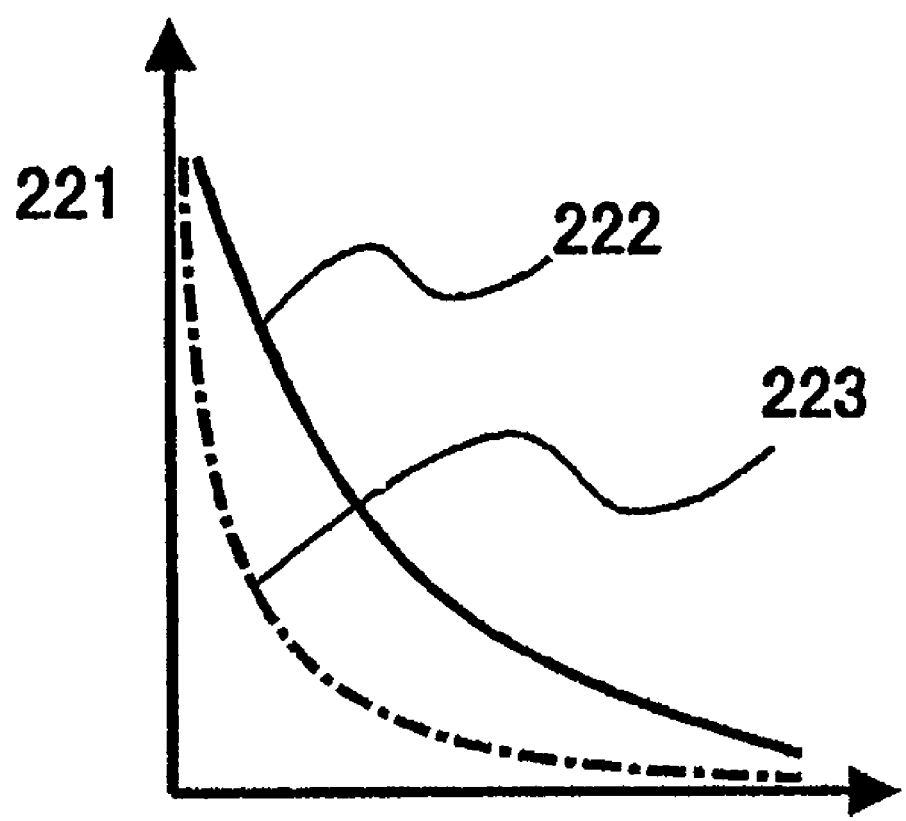
FIG. 9 is a figure showing difference in output light intensity due to the presence or absence of a data mark 220 for a wavelength $\lambda_2 = 515$ nm.

FIG. 8 is a top plan view of a part of the information recording medium 206. Data marks 220 are formed of a material different in reflectivity from a substrate. In the present embodiment, used was a substance that undergoes change due to local heating, e.g. a phase change film used in a phase change recording method. When the near-field optical probe 203 is scanned over the surface of the information recording medium 206, the magnitude of interaction between the near-field light 205 and the recording medium surface 206 surface changes due to the presence or absence of the data mark 220. FIG. 9 shows as an example a difference in output light intensity for a wavelength of $\lambda_2$=515 nm due to the presence or absence of the data mark 220. A similar figure will be obtained for $\lambda_1$=488 nm.

Figure 10:
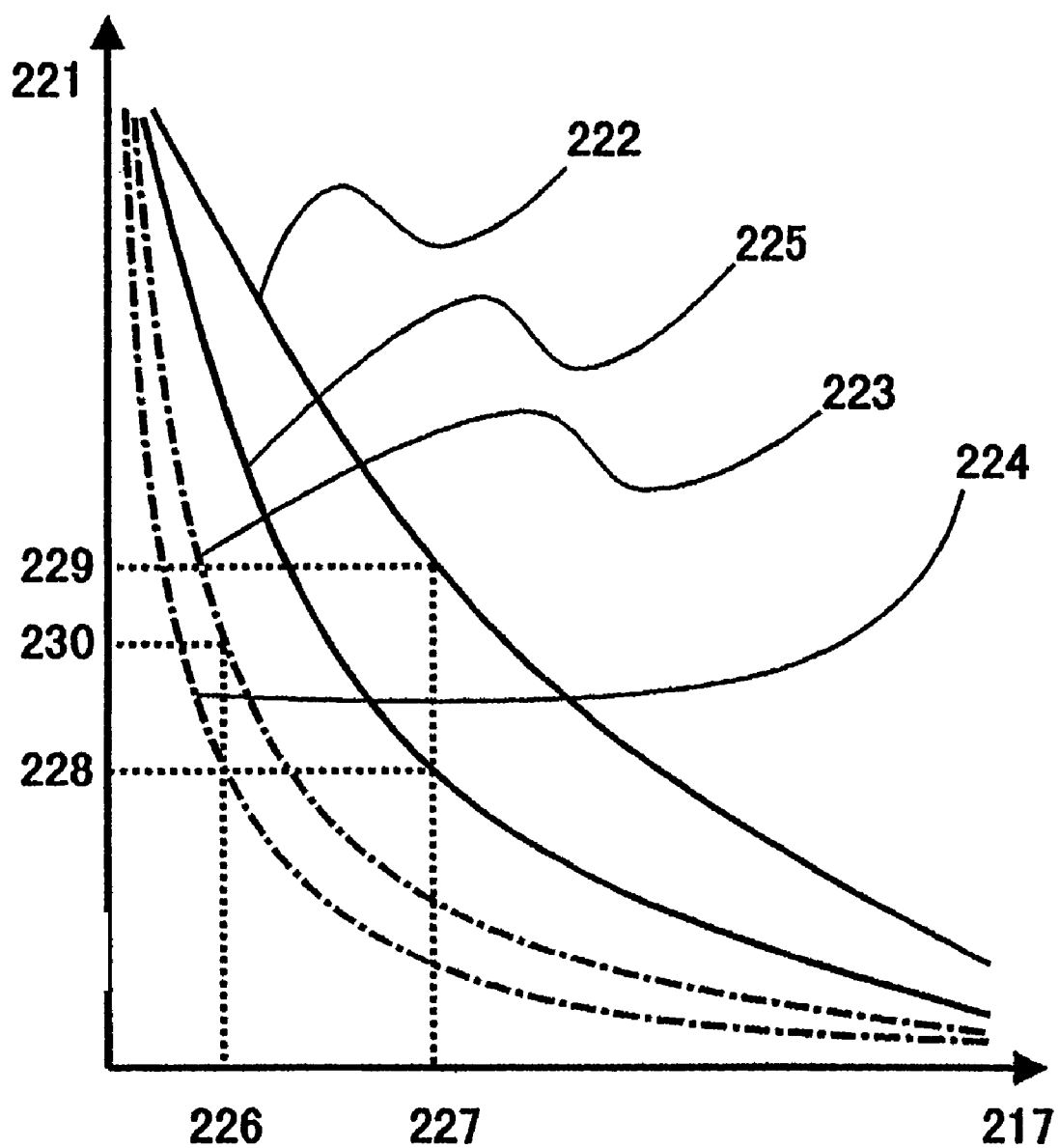
FIG. 10 is a figure showing, by combining FIG. 7 and FIG. 9, a dependency of output signal intensity against an input wavelength and the presence or absence of a datamark.

FIG. 10 is a figure showing, by combining FIG. 7 and FIG. 9, a dependency of an output signal intensity against an input wavelength and a presence or absence of a data mark. Discussed below a signal processing method.

It is assumed that an output signal intensity 228 be obtained with a wavelength $\lambda_1$ at a certain instance. At this time, there are a possibility A that no data mark is present under the probe with a distance 226 between the probe and the recording medium, and a possibility B that a data mark is present under the probe with a distance 227 between the probe and the recording medium. Consequently, the wavelength is switched to $\lambda_2$ before intentionally moving in distance the probe. For the case of the possibility A the output is at 230, while for the possibility B the output is at 229. If utilizing that 229 and 230 be necessarily different, two of information are obtained at the same time about a distance between the probe and the recording medium and a presence and absence of a data mark. It is preferred that the distance between the probe and the recording medium be set such that a signal intensity obtained from four curves in FIG. 10 becomes the greatest. Information on distance is given to the control circuit 212 so that actuators 207 and 211 respectively operate a fine movement mechanism 209 and a rough movement mechanism 210 to effect control for keeping a desirable distance. Also, information on a presence or distance of a data mark becomes an output signal of the present information reproducing apparatus.

This could realize that the probe 203 is controlled in z-axis position without mechanically vibrating the probe 203 in the z direction. A compact apparatus structure was realized without the necessity of a mechanism to vibrate the probe 203 in the z direction and a mechanism to detect an amplitude of the vibration. Also, because the probe 203 was not physically in contact with the recording medium, damage to the probe and recording medium was eliminated to occur. For Embodiments 1 and 2, a signal peak detecting mechanism 18 was required and further, as stated before, information required for distance control was obtained after scanning the probe over a distance of nearly 8 times a minimum unit of a data mark size. In the present embodiment, however, peak detection is unnecessary and distance control is possible at a time stage that the probe has scanned by a data mark minimum unit.

EMBODIMENT 4

Figure 11:
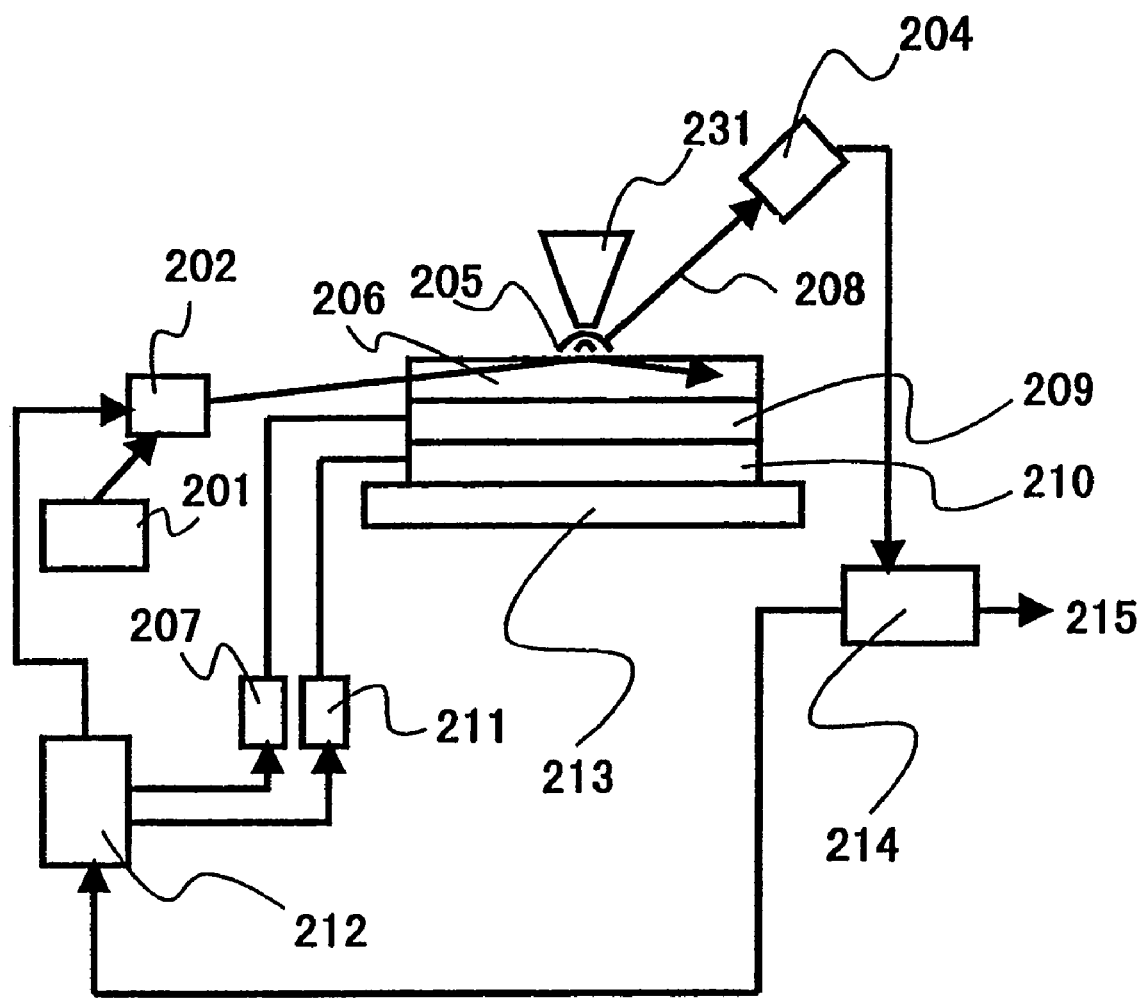
FIG. 11 is a block diagram showing a schematic structure of an information reproducing apparatus according to Embodiment 4 of the invention.

FIG. 11 is a block diagram showing a schematic structure of an information reproducing apparatus according to Embodiment 4 of the invention. The difference from FIG. 6 lies in that the near-field probe 231 used at its tip a probe having a sharp projection of a size of approximately 100 nm instead of the microscopic aperture as in FIG. 6 and that incident light is introduced from the below of the recording medium 206 to produce near-field light 205 due to total reflection. Other points are same as those of FIG. 6 and explanation thereof is omitted. Incident light is introduced onto a side surface of the recording medium 206 through an optical fiber (not shown), which propagates inside the recording medium 206 through total reflection. Near-field light 205 occurs in the surface of the recording medium 206 due to internal total reflection. The near-field light 205 differs in its distribution of intensity depending on an optical characteristic of the recording medium 206 surface, i.e. the presence or absence of a data mark. The near-field light 205 is scattered by the near-field light probe 231 into scattering light 208 to be detected by the light receiving element 204. This embodiment is the same as Embodiment 3 in that there is necessity to accurately control a distance between the near-field probe 231 and the according medium 206 surface. Further, the z direction dependency of near-field light is theoretically the same as that of Embodiment 3. Accordingly, it is possible to use the same method as that of Embodiment 3. That is, input is made to switch between two wavelengths by an acoustic optical element 202. Using output signal intensities for them, the probe 231 can be controlled in z direction position through the control circuit 212 without mechanically vibrating the probe 231. At the same time, information reproduction became possible from the memory medium 206.

Thus there is unnecessity of using a mechanism to vibrate the probe 231 in the z direction and a mechanism to detect an amplitude of the vibration, thus realizing a compact apparatus structure. Also, because the probe 231 will not be in physical contact with the recording medium, eliminated is damage to the probe and recording medium due to such contact.

Also, because the probe 231 does not require to have a microscopic aperture at its tip, the probe is simpler to produce.

EMBODIMENT 5

Figure 12:
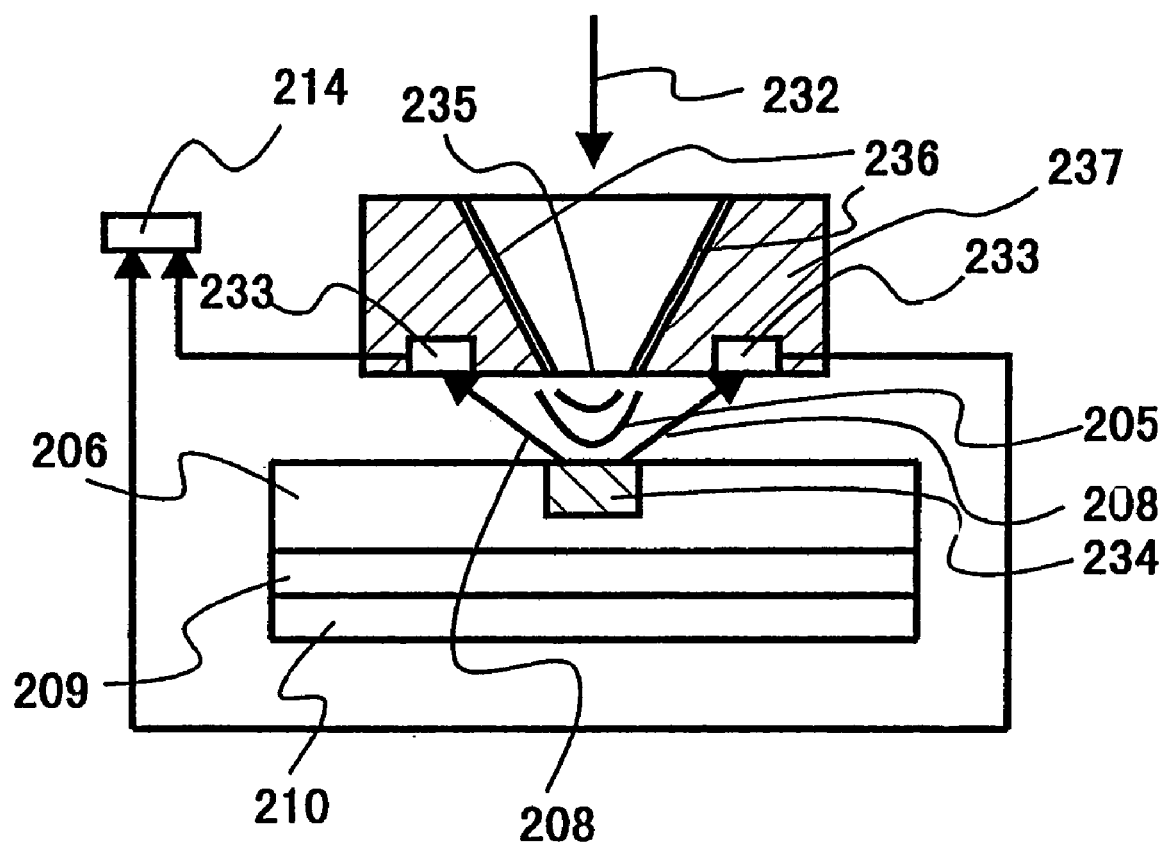
FIG. 12 is a block diagram showing a schematic structure of an information reproducing apparatus according to Embodiment 5 of the invention.

In the present embodiment, a flat-surface probe 237 was utilized as a near-field probe which has an inverted conical hole formed therethrough to provide a microscopic aperture as stated before at the top. FIG. 12 shows a schematic structure of an information reproducing apparatus according to Embodiment 5. The present embodiment is similar to Embodiment 3 in apparatus general structure, operating mechanism and signal processing circuit, detailed explanations being omitted. The flat-surface probe according to the present embodiment is fabricated by a silicon process generally used in the conventional semiconductor manufacturing technology. The light receiving element 233 comprises a photodiode or the like integrated on a silicon wafer. A silicon substrate can be formed with an inverted conical hole by anisotropic etching of silicon, on an inner surface of which Al is film-formed as a reflection film 236 to prevent light from coming incident on the silicon substrate and being absorbed by the silicon substrate. Input light 232 introduced through a lens system or optical waveguide (not shown) produces near-field light 205 from a microscopic aperture 235 formed at a tip of the probe. The scattering light 208 caused resulting from interaction between this and a data mark 234 is detected by the light receiving element 233. Because the z direction dependency of near-field light is theoretically the same as that of Embodiment 3, the probe can be controlled in-axis position by the same way as Embodiment 3 without giving mechanical vibration. At the same time, information reproduction is possible from the recording medium 206.

Thus there is unnecessity of using a mechanism to vibrate the flat-surface probe 237 in the z direction and a mechanism to detect an amplitude of the vibration, realizing a compact apparatus structure. Also, because the probe 237 will not be in physical contact with the recording medium, eliminated is damage to the probe and recording medium due to such contact. Also, the adoption of the flat-surface probe achieved a compact apparatus structure. Furthermore, because the flat-surface probe can be fabricated by using a semiconductor manufacturing technology, mass production is feasible with reproducibility. Moreover, it is possible for the flat-surface probe 237 to use, as a scanning method over a recording medium, a flying head technique (a wedge-formed taper is provided in a head including a probe through which air is fed to provide air flow between the probe and the recording medium surface to float the head with respect to the recording medium due to balance with an previously-applied urging force on the head toward the recording medium) utilized in the conventional hard disc.

EMBODIMENT 6

Figure 13:
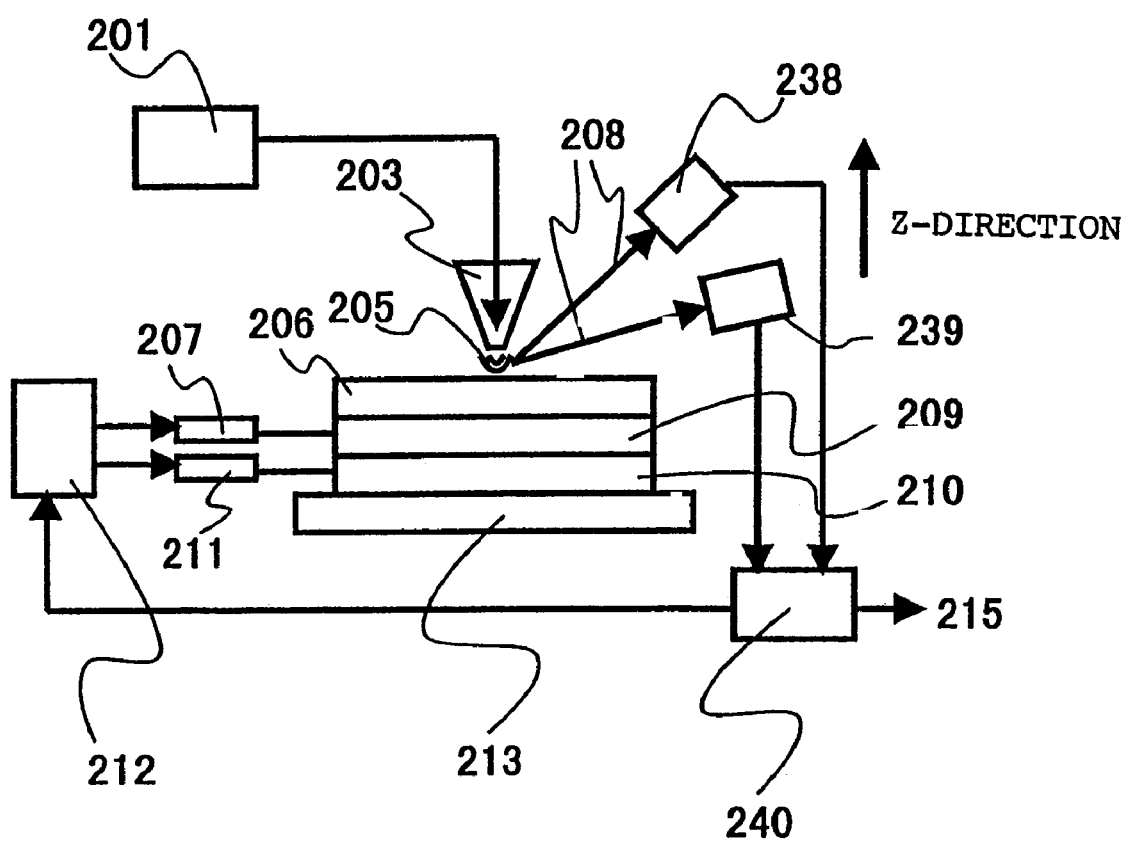
FIG. 13 is a block diagram showing a schematic structure of an information reproducing apparatus according to Embodiment 6 of the invention.

FIG. 13 is a block diagram showing a schematic structure of a information reproducing apparatus according to Embodiment 6 of the invention. This embodiment is different from FIG. 6 in that no acoustic optical element 202 is provided that selects an input light wavelength from a laser light source 201 and instead a light receiving element is provided that has a light receiving element 238 for a wavelength $\lambda_1$ and a light receiving element 239 for a wavelength $\lambda_2$ and that the content of processing in a signal processing circuit 240 is different. Other points are the same as those of FIG. 6 and explanations thereof are omitted. The laser light source 201 emits light with wavelengths, for example, of 488 nm and 515 nm. The light is turned into near-field light 205 and interacts with the recording medium 206 resulting in scattering light 208. Here, the light receiving element 238 receives a wavelength $\lambda_1$ of light and the light receiving element 239 receives a wavelength $\lambda_2$ of light. In the signal processing circuit 240, using these signals it is possible to simultaneously obtain distance information between the probe and the recording medium and information on the presence and absence of a data mark in FIG. 10 explained in Embodiment 3. Among them, the distance information is sent to the control circuit 212 and used for probe-to-medium distance control through the rough movement mechanism 211 and fine movement mechanism 207. The data mark presence or absence information is turned into an output signal 215 of this information reproducing apparatus.

In the present embodiment, because no acoustic optical element is provided, a simple apparatus structure is feasible. Furthermore, it is possible to simultaneously obtain output signals due to the two wavelengths. Accordingly, there is no need to provide synchronization with the input light, simplifying the signal processing circuit.

EMBODIMENT 7

Figure 14:
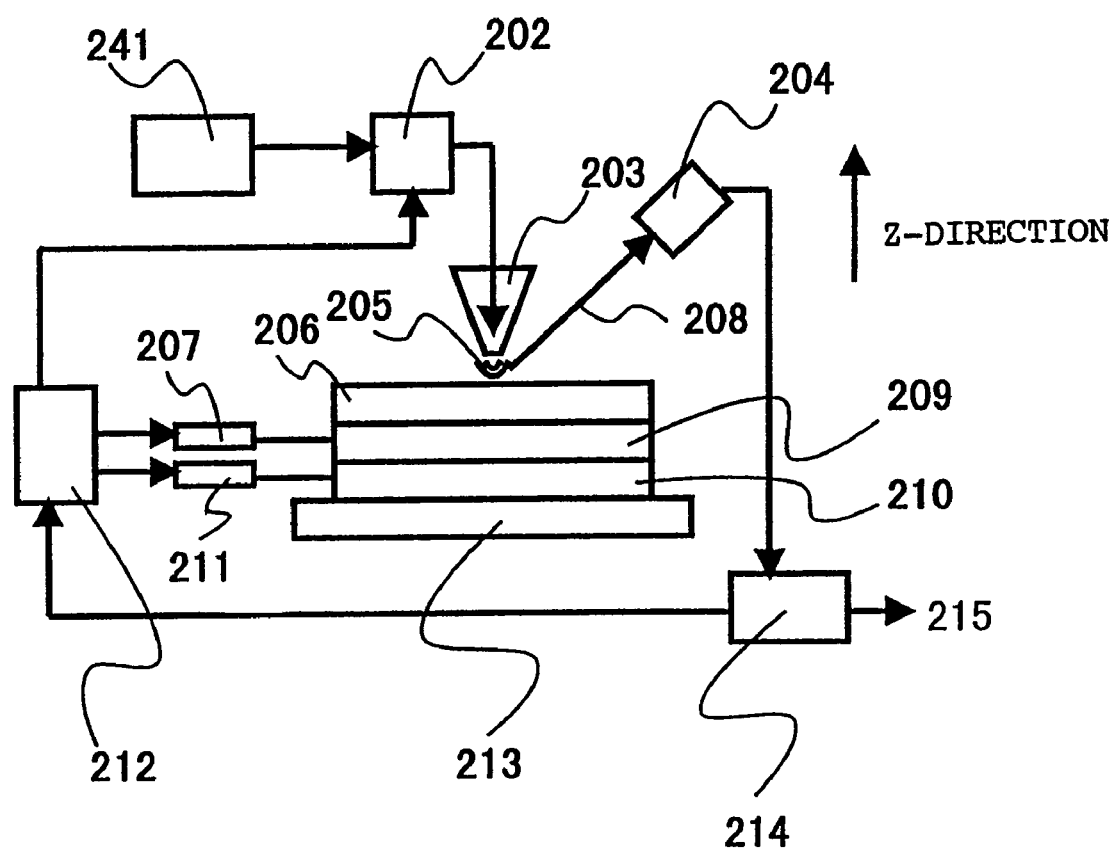
FIG. 14 is a block diagram showing a schematic structure of an information reproducing apparatus according to Embodiment 7 of the invention.

FIG. 14 is a block diagram showing a schematic structure of an information reproducing apparatus according to Embodiment 7 of the invention. This embodiment is different from FIG. 6 in that a light source 241 uses an LED. The LED possesses a finite width of an output light wavelength (typically, a wavelength half width of approximately 15 nm for a light source with a wavelength of 800 nm), differently from a gas laser. As explained in Embodiment 3, the attenuation of near-field light in the z direction is strongly dependent upon wavelength. In order to accurately control the probe position, there is a necessity to accurately select two wavelengths of light to be utilized. The use of an acoustic optical element 202 selects and switches in time two particular wavelengths from the light of the LED light source having a broad range of wavelengths. This results in switching between two wavelengths of light input to the near-field light probe 203, and thereafter the probe can be controlled in z direction position by the same operation as in Embodiment 3. This increases the kinds of light sources that can be utilized, and makes it possible to select light of an optimal wavelength for probe position control. Also, the LED light source, as an incoherent light source, can remove noise components that occur when using a coherent light source, such as speckle.

In this embodiment, it is possible to provide a structure without using an acoustic optical element, by using two light receiving elements similarly to Embodiment 6.

EMBODIMENT 8

Figure 15:
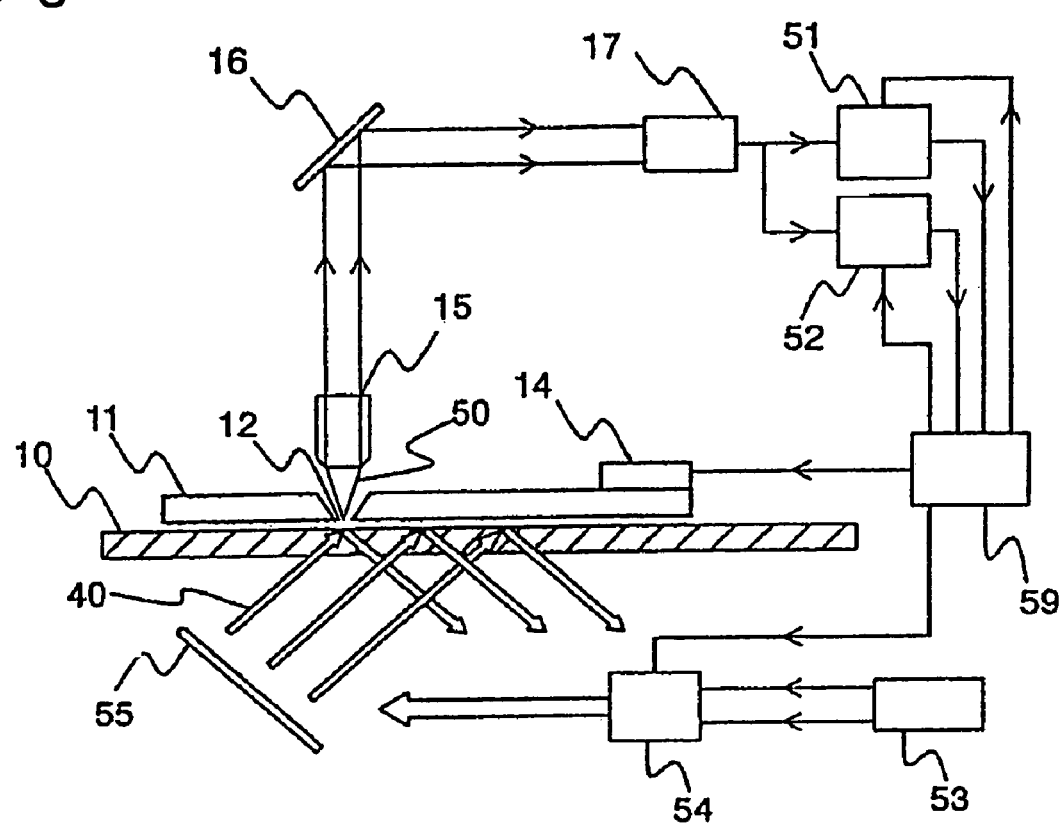
FIG. 15 is a block diagram showing a schematic structure of an information reproducing apparatus according to Embodiment 8 of the invention.

FIG. 15 is a block diagram showing a schematic structure of a recording apparatus according Embodiment 8. Incidentally, the parts common to those of FIG. 1 are attached by the same reference characters.

In FIG. 15, laser light 40 is illuminated directed from a back side of the recording medium 10 to the surface of the recording medium 10, preferably under a total reflection condition to the backside of the recording medium 10. Due to this, near-field light is created and localized in the surface of the recording medium 10. The aperture element 11 is brought into proximity to the recording medium 10 such that the microscopic aperture 12 is positioned in a region of the localized near-field light. Here, the laser light 40 is light mixed with different modulation frequencies from each other of information reproducing laser light (modulation frequency f1) and distance control laser light (modulation frequency f2). The near-field light localized in the surface of the recording medium 10 also contains different two modulation frequency components. The laser light 40 containing two modulation frequency components is created by modulating, in an optical modulator 54, the laser light emitted from the laser light source 53 to a modulation frequency f1 assigned for information reproducing laser light and a modulation frequency f2 assigned for distance control laser light based on a modulation signal sent from the control mechanism 59, and illuminated onto the recording medium 10 through a mirror 55. Also, such laser light 40 containing two modulation frequency components may be created by directly performing frequency modulation within the laser light source 53 without using the optical modulator 54.

When the microscopic aperture 12 is inserted in the localized near-field light region on the recording medium 10, the near-field light is scattered by the microscopic aperture 12. The scattered light (propagation light) is introduced through the microscopic aperture 12 to a focusing optical system 15 placed above the microscopic aperture 12. Thus, detection of near-field light is achieved in a collection mode as stated before. The propagation light introduced to the focusing optical system 15 is introduced through a mirror 16 to a light detecting mechanism 17 and converted into an electric signal. The electric signal outputted from the light detecting mechanism 17 contains two different modulation frequency components (f1 and f2) similarly to the scattered near-field light, and transmitted to an information reproduced signal phase detector 51 and distance signal phase detector 52. The information reproduced signal phase detector 51 receives from the control mechanism 59 a detection reference signal for extracting a frequency component f1, thereby deriving a reproduced signal. The distance signal phase detector 52 receives from the control mechanism 59 a detection reference signal for extracting a frequency component f2, thereby deriving a distance control signal. The derived reproduced signal and distance control signal are respectively transmitted to the control mechanism 59. The control mechanism 59 sends a control signal to the Z-axis control mechanism 14 to control a position of the microscopic aperture 12 such that held is a value represented by a distance control signal sent from the distance signal phase detector 52, thus conducting position control of the aperture element 11. Also, in the control mechanism 59 determined is a recording state of information in a reproduce position where the microscopic aperture 12 is positioned, based on a reproduced signal transmitted from the information reproduced signal phase detector 51, thus achieving information reproduction.

Therefore, it is possible to reproduce high density information recorded on the recording medium 10 and hold the aperture element 11 and the recording medium 10 in a proximity state, both by the utilization of near-field light. Thus, the recording apparatus is simplified in structure. Furthermore, a reproducing probe (flat-surface probe) without having sharpened tip can be used in the recording apparatus. Furthermore, it is possible to carry out information reproduction and aperture element proximity control with positiveness and reliability, by assigning and utilizing different wavelengths to laser light to be used for reproducing information recorded on the recording medium (information reproducing laser light) and laser light to be used for effecting proximity control for the aperture element (distance control laser light).

Figure 16:
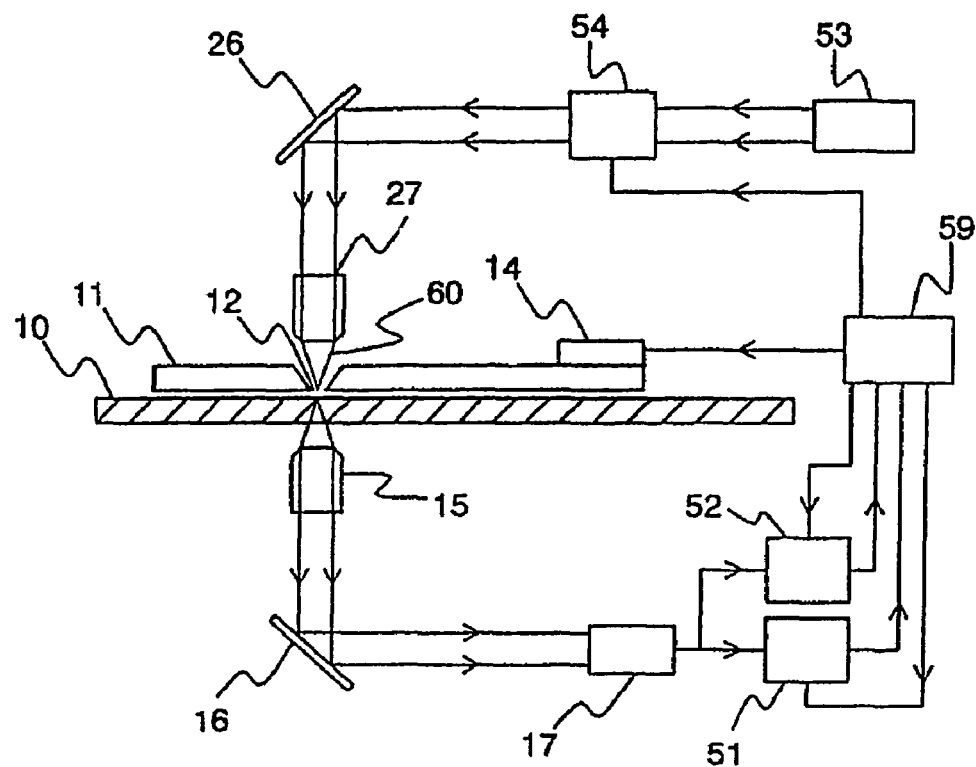
FIG. 16 is a block diagram showing a modification to the information reproducing apparatus according to Embodiment 8 of the invention.

FIG. 16 is a structure view of a recording apparatus for a case, in the record apparatus explained in FIG. 15, of detecting near-field light in an illumination mode. Incidentally, the parts common to those of FIG. 15 are attached with the same reference characters.

In FIG. 16, the laser light emitted from a laser light source 53 is frequency modulated by a optical modulator 54 to create laser light containing two modulation frequency components for information reproduction and distance control. The laser light is introduced through the mirror 26 to the light illumination optical system 27, and illuminated directed to the microscopic aperture 12 through the inverted conical hole in the aperture element 11. Due to this, near-field light is created in the microscopic aperture 12. The aperture element 11 is brought into proximity to the recording medium 10 such that the surface of the recording medium 10 is positioned in a region of the created near-field light. Here, the near-field light created in the microscopic aperture 12 also contains two different frequency components (f1 and f2).

If the near-field light created by the microscopic aperture 12 reaches the surface of the recording medium 10, the near-field light is scattered by a fine structure on the surface of the recording medium 10. The scattered light (propagation light) is introduced to the focusing optical system 15 arranged on the back side of the recording medium 10. Thus, detection of the near-field light is achieved in the illumination mode. The propagation light introduced into the focusing optical system 15 is introduced to the light detecting mechanism 17 through the mirror 16 and converted into an electric signal. The processing of an electric signal outputted from the light detecting mechanism 17, i.e. creation of a reproduced signal and distance control signal and proximity control responsive to the distance control signal, is similar to operation shown in FIG. 5 and explanation thereof will be herein omitted.

Consequenty, it is possible to reproduce the high density information recorded on the recording medium and hold a proximity state for the aperture element and the recording medium, both through utilization of near-field light. Thus, the recording apparatus is simplified in structure. Further, a reproducing probe (flat-surface probe) without having a sharpened tip can be used in a recording apparatus. Furthermore, it is possible to carry out information reproduction and aperture element proximity control with positiveness and reliability, by assigning and utilizing different wavelengths to laser light to be used for reproducing information recorded on the recording medium (information reproducing laser light) and laser light to be used for effecting proximity control for the aperture element (distance control laser light). Also, because the illumination mode is adopted for detecting near-field light, local illumination of thermal energy is possible. Therefore, besides reproduction of information recorded high in density, recording information with density is possible due to providing thermal energy.

In Embodiment 1, 2 or 8 explained above, although the aperture element (reproduce probe) used a flat-surface substrate (flat-surface probe) having a microscopic aperture, it is possible to use a cantilever type probe or optical fiber processed for near-field microscope.

Figure 17:
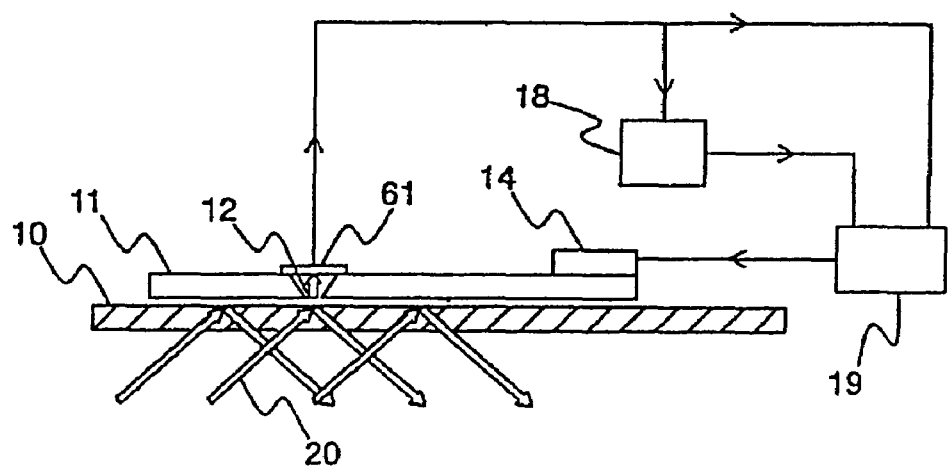
FIG. 17 is a block diagram showing another example of an aperture element of a recording apparatus according to the invention.

In particular, where the reproduce probe adopts a flat-surface probe, a collection mode can be achieved by directly arranging a photodetector such as a photodiode or the like, in place of the light detecting mechanism, at an upper surface portion opposite to the microscopic aperture. FIG. 17 is a block diagram showing a recording apparatus wherein the structure of FIG. 1 formed by the focusing optical system 15, the mirror 16 and the light detecting mechanism 17 is replaced with a light detector 61 directly arranged on the aperture element 11.

As shown in FIG. 17, the arrangement of the light detector 61 on the aperture element 11 can eliminate the structure having the focusing optical system 15, the mirror 16 and the light detecting mechanism 17, thus providing a further simplified recording apparatus. Furthermore, because the light detector 61 is placed in an above position fully proximity to the microscopic aperture 12, it is possible to prevent loss of propagation light taken out of the microscopic aperture 12, obtaining an intense reproduced signal or distance control signal.

Figure 18:
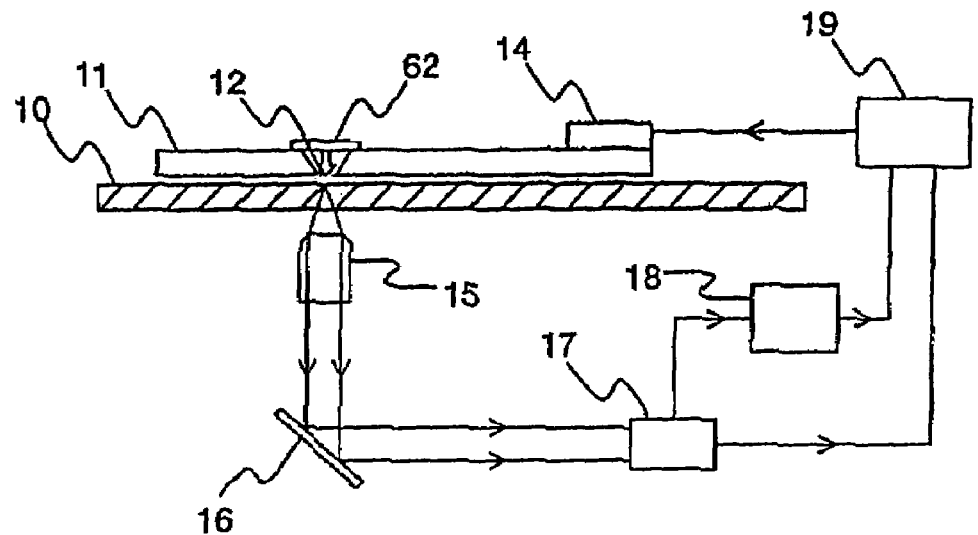
FIG. 18 is a block diagram showing another example of an aperture element of a recording apparatus according to the invention.

Also, an illumination mode can be achieved by directly arranging a light illuminator such as a surface light emitting laser, in place of the laser light source, at an upper surface portion opposite to the microscopic aperture. FIG. 18 is a block diagram of showing a recording apparatus wherein the structure having the laser light source 25, the mirror 26 and the light illuminating optical system 27 in FIG. 3 is replaced with a light illuminator 62 directly arranged on the aperture element 11.

As shown in FIG. 18, the arrangement of a light illuminator 62 on the aperture element 11 can eliminate a structure formed by the laser light source 25, the mirror 26 and the light illuminating optical system 27, thus providing a simplified recording apparatus. Also, because the light illuminator 62 is arranged in an above position fully proximity to the microscopic aperture 12, sufficiently intense light with less propagation loss can be illuminated to the microscopic aperture 12. This provides creation of sufficiently intense near-field light.

Figure 19:
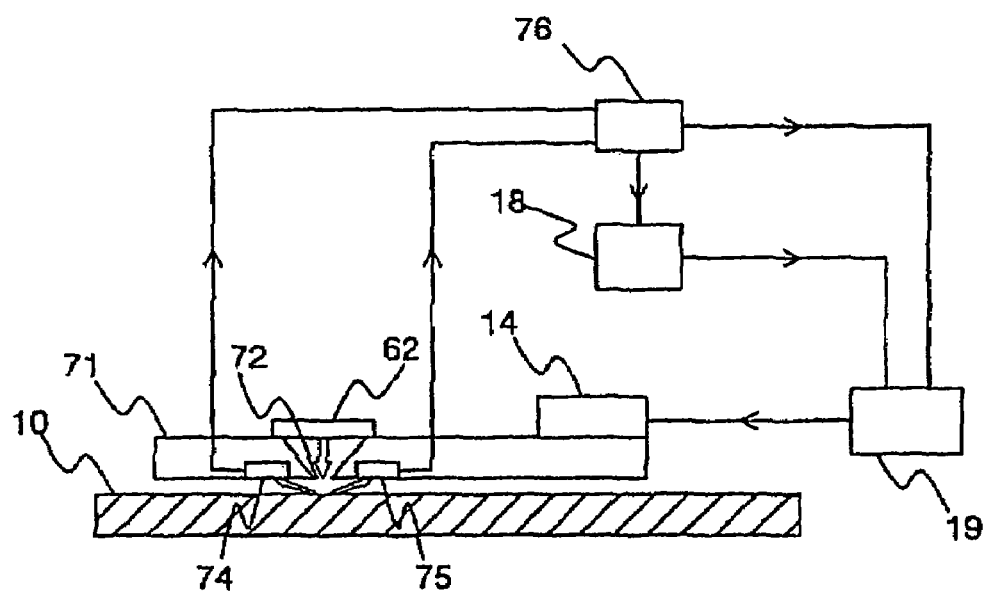
FIG. 19 is a block diagram showing another example of an aperture element of a recording apparatus according to the invention.

Furthermore, by arranging a photodetector such as a photodiode in the vicinity of an edge of the microscopic aperture 12 on the aperture element 11, it is possible to eliminate a structure in FIG. 18 having the focusing optical system 15, the mirror 16 and the light detection mechanism 17. FIG. 19 is a block diagram of a recording apparatus having an amplifying mechanism 76 wherein the structure having the focusing optical system 15, the mirror 16 and the light detection mechanism 17 of FIG. 18 is replaced with photodetectors 74 and 75 directly arranged on the aperture element, so that an electric signal outputted by the photodetector 74 and 75 can be properly amplified and sent to the light detection mechanism 18 and control mechanism 19.

As shown in FIG. 19, the use of the aperture element 71 arranged with the light illuminator 62 and the photodetectors 74 and 75 can eliminate not only the structure of the laser light source 25, the mirror 26 and the light illuminating optical system 27 but also the structure of the focusing optical system 15, the mirror 16 and the light detection mechanism 17. Thus, a simplified structured recording apparatus can be provided. Also, because the propagation light detection by the photodetectors 74 and 75 is for the near-field light created in the surface of the recording medium 10. Accordingly, it is possible to arrange on a recording medium 10 surface side the structure to create near-field light and the structure to detect propagation light due to scattering the near-field light, reducing the size of the apparatus.

Incidentally, it is needless to say that the aperture element 11 arranged with the photodetector 61 and the light illuminator 62 or the aperture element 71 arranged with the light illuminator and the photodetectors 74 and 75 shown in FIG. 17, FIG. 18 and FIG. 19 is also applicable to the recording apparatus as explained in Embodiments 2 and 8.

EMBODIMENT 9

Figure 20:
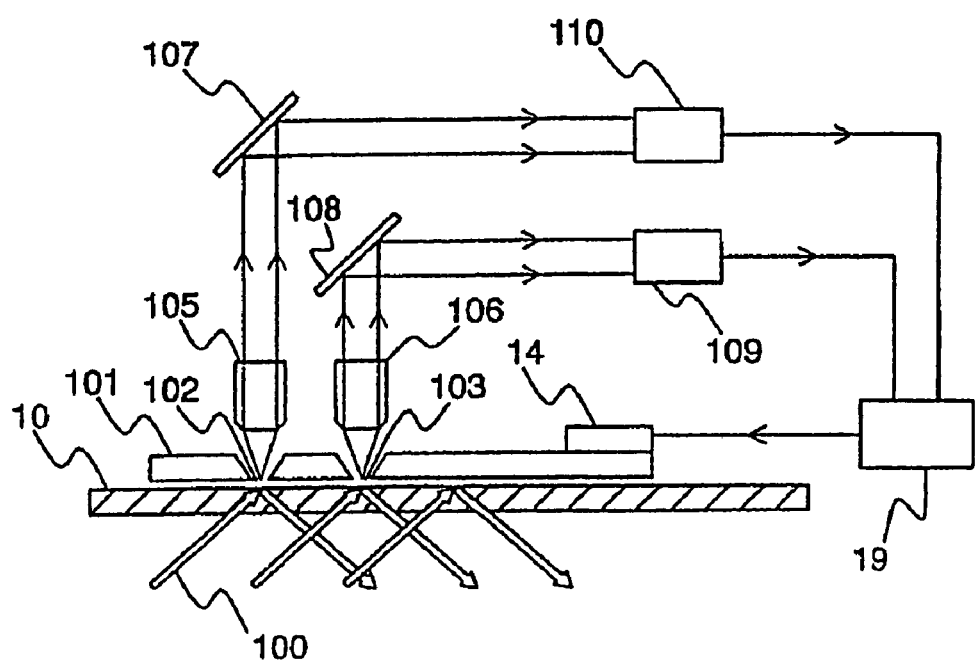
FIG. 20 is a block diagram showing a schematic structure of a recording apparatus according to Embodiment 9 of the invention.

FIG. 20 is a block diagram showing a schematic structure of a recording apparatus according to Embodiment 9. Incidentally, the parts common to those of FIG. 1 are attached with the same reference characters.

In FIG. 20, an aperture element 101 is a flat-surface substrate that two microscopic apertures 102 and 103 are formed in the aperture element 11 explained in Embodiment 1. The microscopic apertures 102 and 103 are in a size suited for creating or scattering near-field light, e.g. having a diameter of several tens of nano-meters. Furthermore, on the aperture element 101 a Z-axis control mechanism 14 is provided to control the microscopic apertures 102 and 103 in proximity to the recording medium 10. Here, the microscopic aperture 102 is a microscopic aperture used for information reproduction while the microscopic aperture 103 is a microscopic aperture used for control the aperture element 101 in proximity to the recording medium 10.

In order to achieve information reproduction utilizing near-field light, laser light 100 is illuminated directed from a back side of the recording medium 10 to the surface of the recording medium 10, preferably under a total reflection condition to the backside of the recording medium 10. Due to this, near-field light is created and localized in the surface of the recording medium 10. The aperture element 101 is brought proximity to the recording medium 10 such that the microscopic apertures 102 and 103 are positioned in a region of the localized near-field light.

When the microscopic apertures 102 and 103 are inserted in the localized near-field light region on the recording medium 10, the near-field light is scattered by the microscopic apertures 102 and 103. The scattered light (propagation light) is introduced and collected through the microscopic apertures 102 and 103 respectively to the focusing optical systems 105 and 106 placed above the microscopic apertures 102 and 103. Thus, detection of near-field light is achieved in a collection mode. The propagation light created by the microscopic aperture 102 and introduced due to scattering to the focusing optical system 105 is introduced through a mirror 107 to a light detecting mechanism 110 and converted as a reproduced signal into an electric signal. Also, the propagation light created by the microscopic aperture 103 and introduced due to scattering to the focusing optical system 106 is introduced through a mirror 108 to a light detecting mechanism 109 and converted as a distance control signal into an electric signal. These reproduced signal and distance control signal are both sent to the control mechanism 19. The control mechanism 19 transmits a control signal to the Z-axis control mechanism 14 in order to control the microscopic aperture 103 such that a value represented by a distance control signal is held that is transmitted from the light detecting mechanism 109, thus controlling the position of the aperture element 101. Also, in the control mechanism 19 determination is made on a recording condition of information in a reproduce position where the microscopic aperture 102 is positioned based on the reproduced signal directly sent from the light detecting mechanism 110, thus achieving information reproduction.

Accordingly, it is possible to reproduce high density information recorded on the recording medium 10 and hold the aperture element 101 in proximity to the recording medium 10, both by utilizing near-field light. Thus, the recording apparatus is simplified in structure, and a reproduce probe without having a sharpened tip can be used for the recording apparatus. Furthermore, independently formed in the aperture element 101 are the microscopic aperture 102 used for reproducing information recorded on the recording medium 10 and the microscopic aperture 103 used for conducting proximity control of the aperture element 101. Consequently, information reproduction and aperture element proximity control are possible with positiveness and reliability.

FIG. 21 is a block diagram of a recording apparatus wherein in the recording apparatus explained in FIG. 20 a system formed by one mirror, the focusing optical system and the microscopic aperture is utilized to enable information recording onto the recording medium 10. Incidentally, the parts common to those of FIG. 20 are attached with the same reference characters.

Figure 21A:
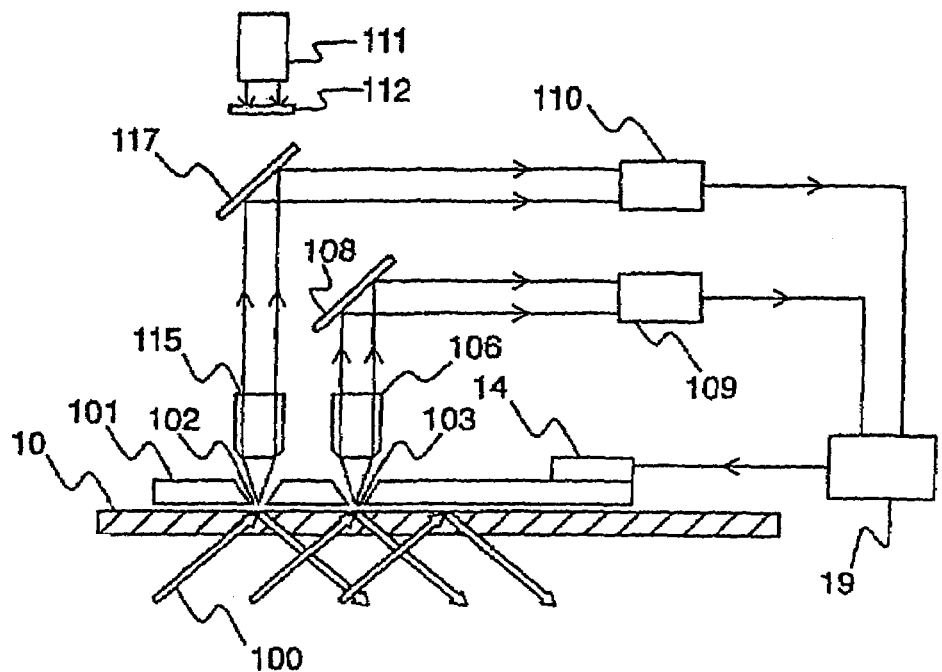
FIG. 21 is a block diagram showing a modification to the recording apparatus according to Embodiment 9 of the invention.

In FIG. 21(a), a dichroic mirror 117 and a light illumination/focusing optical system 115, when conducting information reproduction, respectively function as the mirror 107 and the focusing optical system 115 shown in FIG. 20. A laser light source 111 is a light illuminating means for recording information. When reproducing information, laser light therefrom is blocked off by a shutter 112. Accordingly, the recording apparatus shown in FIG. 21(a) can effect information reproduction in a collection mode similar to the recording apparatus shown in FIG. 20.

Figure 21B:
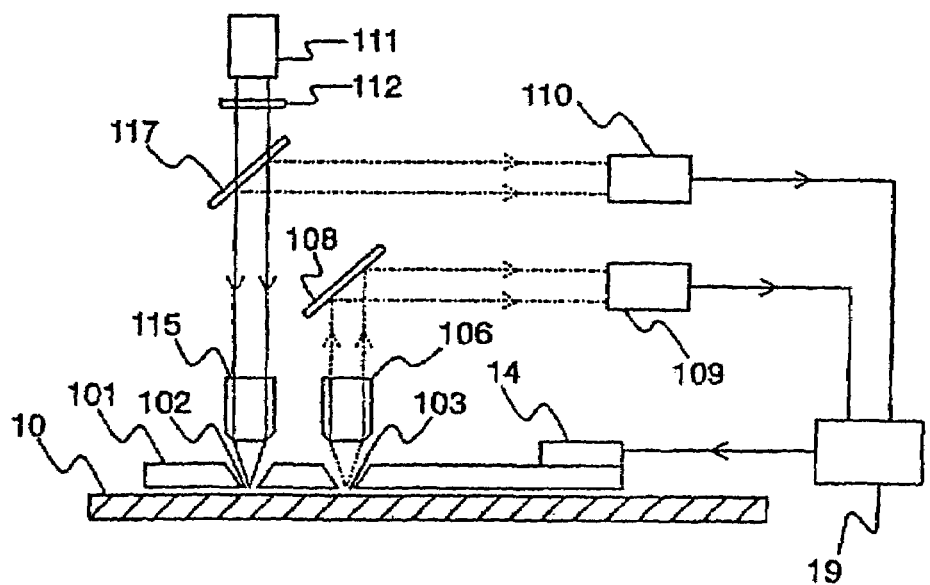

FIG. 21(b) shows a state wherein information recording is made to the recording medium 10 in the recording apparatus shown in FIG. 21(a). In FIG. 21(b), the shutter 112 releases laser light illuminated from the laser light source 111 from being blocked off, to conduct the laser light to the dichroic mirror 117. Simultaneous with releasing the shutter 112, the laser light 100 illuminated from a back side of the recording medium 10 is also blocked off from illuminating by a shielding means (not shown). Due to this, no near-field light is created on the surface of the recording medium 10. Consequently, neither a reproduced signal nor a distance control signal are outputted from the light detecting mechanisms 109 and 110.

The laser light incident on the dichroic mirror 117 is introduced to the light illuminating/focusing optical system 115. On this occasion, the light illuminating/focusing optical system 115 serves as a focusing optical system. The laser light focused by the light illuminating/focusing optical system 115 is introduced to the microscopic aperture 102 to create near-field light. This near-field light can have comparatively high intensity in proportion to the intensity of laser light emitted at the laser light source 111.

Incidentally, the recording medium 10 has in its surface a material to be changed in physical property or structure by the localized application of thermal energy. Due to this, for example binary information of high density recording is possible. The recorded information can be reproduced by the recording apparatus in the state shown in FIG. 21(a).

Consequently, realized are information reproduction in the collection mode and proximity control of the aperture element 101. Further, the provision of the laser light source 111 and the shutter 112 makes possible localized application of thermal energy in the illumination mode, enabling high density information recording.

Figure 22:
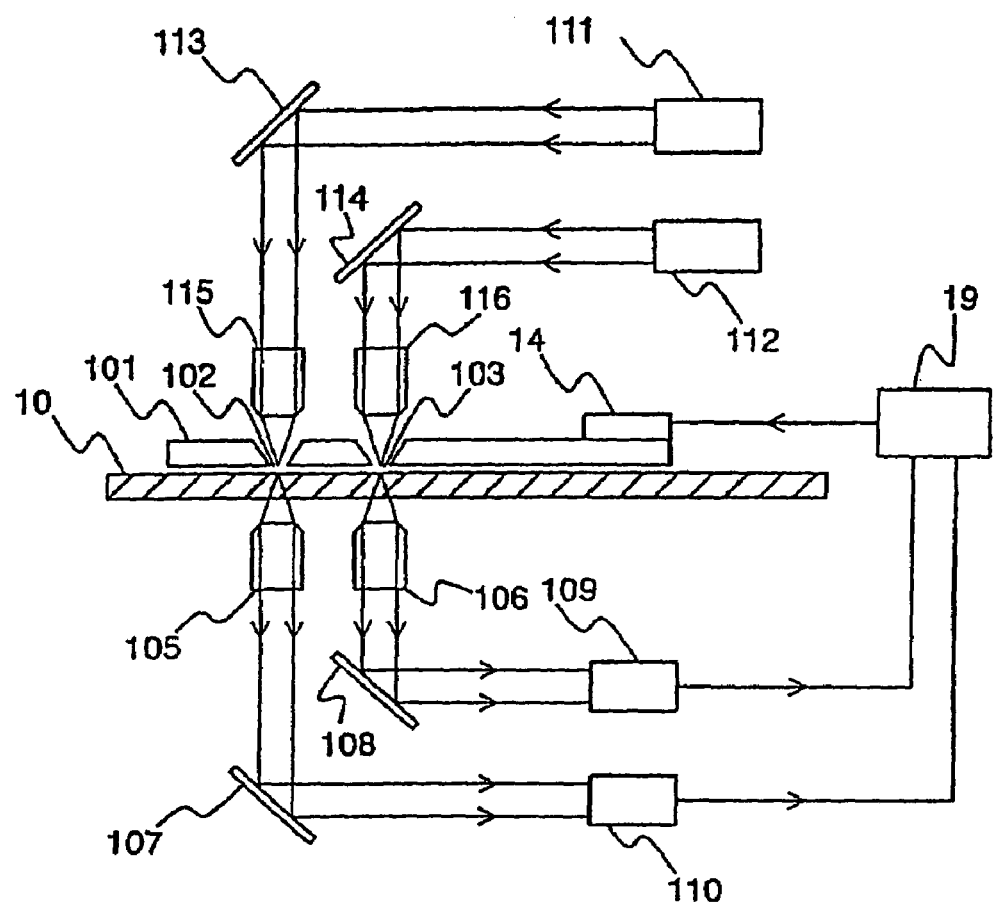
FIG. 22 is a block diagram showing another modification to the recording apparatus according to Embodiment 9 of the invention.

FIG. 22 is a block diagram of a recording apparatus wherein in the recording apparatus explained in FIG. 20 near-field light is detected in the afore-said illumination mode. Incidentally, the parts common to those of FIG. 20 are attached with the same reference characters.

In FIG. 22, the laser light emitted from a laser light source 111 is introduced through the mirror 113 to the light illumination optical system 115, and illuminated directed to the microscopic aperture 102 through the inverted conical hole in the aperture element 101. Due to this, near-field light is created in the microscopic aperture 102. Also, the laser light emitted from a laser light source 112 is introduced through the mirror 114 to the light illumination optical system 116, and illuminated directed to the microscopic aperture 103 through the inverted conical hole in the aperture element 101. Due to this, near-field light is created in the microscopic aperture 103. The aperture element 101 is brought into proximity to the recording medium 10 such that the surface of the recording medium 10 is positioned in a region of the near-field light created in the microscopic apertures 102 and 103.

If the regions of near-field light created by the microscopic apertures 102 and 103 reach the surface of the recording medium 10, the near-field light is scattered by a fine structure on the surface of the recording medium 10. The scattered light (propagation light) is introduced and focused to the focusing optical systems 105 and 106 arranged on the back side of the recording medium 10. Thus, detection of the near-field light is achieved in the illumination mode. The propagation light created by the microscopic aperture 102 and introduced through scattering into the focusing optical system 105 is introduced to the light detecting mechanism 110 through the mirror 107 and converted as a reproduced signal into an electric signal. Also, the propagation light created by the microscopic aperture 103 and introduced through scattering into the focusing optical system 106 is introduced to the light detecting mechanism 109 through the mirror 108 and converted as a distance control signal into an electric signal. The processing of these reproduced signal and distance control signal, i.e. creation of a reproduction signal and distance control signal and proximity control in accordance with the distance control signal, are similar to the operations shown in FIG. 20, explanations thereof being omitted herein.

Consequently, it is possible to reproduce the high density information recorded on the recording medium 10 and hold a proximity state for the aperture element 101 and the recording medium 10, both through utilization of near-field light. Thus, the recording apparatus is simplified in structure. Further, a reproducing probe (flat-surface probe) without having a sharpened tip can be used in a recording apparatus.

Furthermore, independently formed in the aperture element 101 are the microscopic aperture 102 used for reproducing information recorded on the recording medium 10 and the microscopic aperture 103 used for conducting proximity control of the aperture element 101. Consequently, information reproduction and aperture element proximity control of the aperture element 101. Consequently, information reproduction and aperture element proximity control are possible with positiveness and reliability. Also, because the illumination mode is adopted for detecting near-field light, the comparatively increased intensity of laser light to be introduced to the microscopic aperture makes possible to create intense near-field light, enabling localized thermal energy illumination. Therefore, besides reproduction of information recorded high in density, recording information with density is possible due to providing thermal energy.

In FIGS. 20 to 22 explained above, the detection of propagation light scattered by the microscopic apertures 102, 103 is made through the corresponding focusing optical systems 105, 106 to the microscopic apertures. Alternatively, in place of the focusing optical systems 105, 106, one optical lens system can be arranged so that the light focused by this optical lens system is separated based on wavelength or modulation frequency, thereby distinguishing propagation light portions due to the two microscopic apertures.

Figure 23:
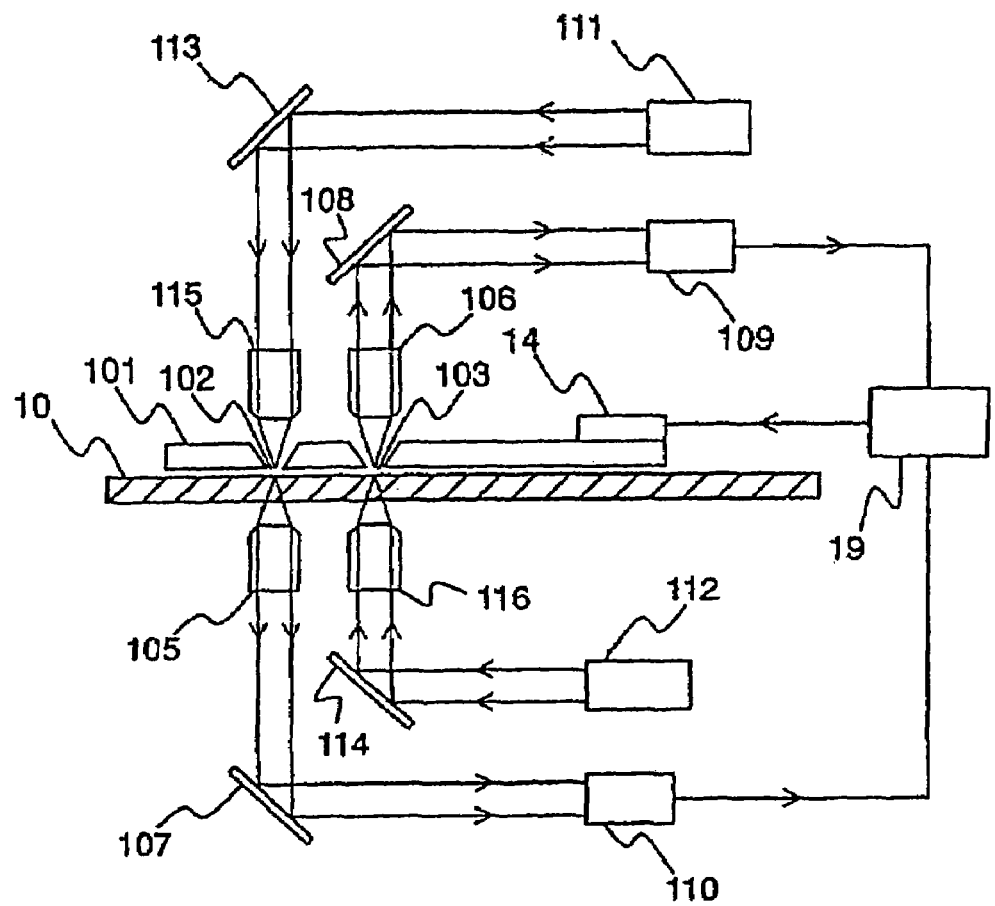
FIG. 23 is a block diagram showing another modification to the recording apparatus according to Embodiment 9 of the invention.

FIG. 23 shows a recording apparatus structure view wherein in the recording apparatus explained in FIG. 22 the microscopic aperture 103 is utilized in the collection mode which is to perform proximity control the aperture element 101 to the recording medium 10. Incidentally, the parts common to those of FIG. 22 are attached with the same reference characters.

As shown in FIG. 23, different creating schemes (illumination mode and collection mode) are applied for those of near-field light utilized in reproducing information recorded on the recording medium 10 and in proximity controlling the aperture element 101 to the recording medium 10. Thus, it is possible to separately, positively detect a reproduced signal and a distance control signal without interference between those of near-field light.

In Embodiment 9 explained above, by assigning different wavelengths or modulation frequencies to those of laser light for creating near-field light to obtain a reproduced signal and distance control signal as explained in Embodiments 2 or 8, it is also possible to separately, effectively detect a reproduced signal and a distance control signal.

Also, the aperture element (reproduce probe) can employ a cantilever type optical probe or optical fiber probe used for near-field microscopes. Incidentally, the aperture element 11 arranged with the photodetector 61 and light illuminator 62 or the aperture element 71 arranged with the light illuminator, photodetectors 74 and 75 shown in FIG. 17, FIG. 18 and FIG. 19 can apply for each microscopic aperture explained in Embodiment 9.

Furthermore, in Embodiments 1, 2 and 8, 9 the microscopic aperture utilized to detect a reproduced signal may be formed in plurality of number in the aperture element. In this case, a plurality of information recorded on the recording medium can be reproduced simultaneously.

EMBODIMENT 10

Next, a recording apparatus according to Embodiment 10 is explained. The recording apparatus according to Embodiment 10 is characterized in that a step is provided in an underside of the aperture element in the recording apparatus according to Embodiment 9 to provide respective microscopic apertures corresponding to the difference of the step.

Figure 24:
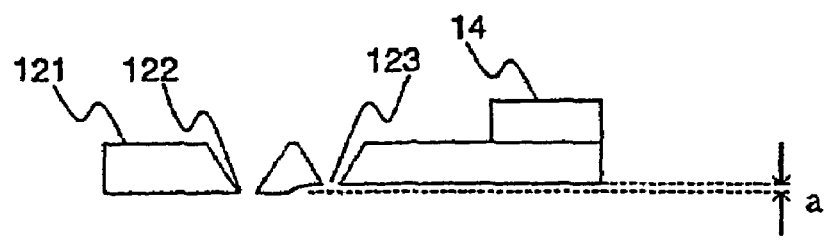
FIG. 24 is a block diagram showing an aperture element of a recording apparatus according to Embodiment 10 of the invention.

FIG. 24 is a block diagram showing an aperture element of a recording apparatus according to Embodiment 10. In FIG. 24, an aperture element 121 has a step a to divide an underside into two. A microscopic aperture 122 and a microscopic aperture 123 are provided corresponding to the respective undersides. In other words, in the microscopic apertures shown in Embodiment 9 the aperture element 121 is a flat-surface substrate provided with a step between two microscopic apertures. The microscopic aperture 122 and microscopic aperture 123 are each of a size suited to create and scatter near-field light, e.g. having a diameter of several tens nano-meters. Furthermore, a Z-axis control mechanism 14 is provided on the aperture element 121 to control the microscopic 102 and 103 portion in proximity to the according medium 10. Here, the microscopic aperture 122 is a microscopic aperture used to reproduce information, while the microscopic aperture 123 is a microscopic aperture to control the aperture element 121 in proximity to the recording medium 10 and to create a signal relatively fixed to a signal to be detected in the microscopic aperture 122.

The presence of the step a provides a difference in position to scatter near-field light created on the surface of the recording medium, i.e. in distance from the surface of the recording medium to the microscopic apertures. Consequently, for example the intensity of propagation light scattered by the microscopic aperture 122 and introduced to the light detecting element 110 shown in Embodiment 9 is largely different from the intensity of propagation light scattered by the microscopic aperture 123 and introduced to the light detecting element 109 shown in Embodiment 4. This is because the near-field light created on the surface of the recording medium has an intensity dependent upon a distance from the surface.

Accordingly, the propagation light scattered by the microscopic aperture 123 has an intensity always having a constant relative ratio to an intensity of the propagation light scattered by the microscopic aperture 122, based on a near-field light intensity difference as determined by a distance by the step a. Provided that an electric signal obtainable through detecting the propagation light scattered by the microscopic aperture 122 is S1 and an electric signal obtainable through detecting the propagation light scattered by the microscopic aperture 123 is S2, the above relative ratio is calculated to (S1−S2)/S1, (S1−S2)/S2, S2/S1, S1/S2 or the like by an operation expression. The calculation of relative ratio is carried out, for example, only by the control mechanism 19 shown in Embodiment 4. The processing the relative ratio as a distance control signal provides achievement of proximity control through the Z-axis control mechanism 14.

Figure 25:
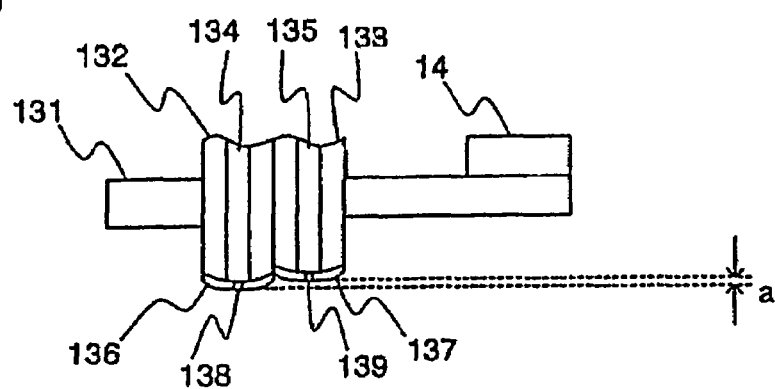
FIG. 25 is a block diagram showing another example of an aperture element of a recording apparatus according to Embodiment 10 of the invention.

Also, besides the flat-surface probe provided with a step as shown in FIG. 24, two optical fibers 132 and 133 may be bundled and placed to provide a vertical step a as shown in FIG. 25. This offers for a similar effect to the aperture element 121. Incidentally, in FIG. 25 a reproduce probe 131 is fixed with the optical fibers 132 and 133 in the flat-surface substrate wherein a Z-axis control mechanism 14 is arranged on the flat-surface substrate. The optical fiber 132 is used to detect a reproduced signal stated before, and has a core 134, a light shielding film 136 of chromium (Cr) or the like and a microscopic aperture 138. Near-field light is scattered in the microscopic aperture 138 to conduct created propagation light to the core 134. Also, the optical fiber 133 is used to detect a distance control signal stated before, and has a core 135, a light shielding film 137 of chromium (Cr) or the like and a microscopic aperture 139. Near-field light is scattered in the microscopic aperture 139 to conduct created propagation light to the core 135.

The aperture element 121 and reproduce probe 131 of the recording apparatus according to Embodiment 10 explained above can be replaced with the aperture element 101 explained in Embodiment 9. Thus, information reproduction is feasible not only in the collection mode but also in the illumination mode.

Accordingly, the microscopic aperture 123 with a step is used relative to the microscopic aperture 122 for reproduction signal detection so that a signal to be detected by the microscopic aperture 123 and a reproduced signal have a relative value to be used as a distance control signal for conducting proximity control of the aperture element 121. Consequently, even where for example an intense reproduced signal cannot be obtained due to insufficient detection of information on the recording medium, a distance control signal is obtainable as a ratio to a reproduced signal with stable intensity. Thus, proximity control of the aperture element is feasible with reliability.

EMBODIMENT 11

Next, explanation will be made on a recording apparatus according to Embodiment 11. The recording apparatus according to Embodiment 11 is characterized in that the effect given by the step between the two microscopic apertures of the recording apparatus according to Embodiment 10 is achieved by finely vibrating an aperture element having one microscopic aperture.

Figure 26:
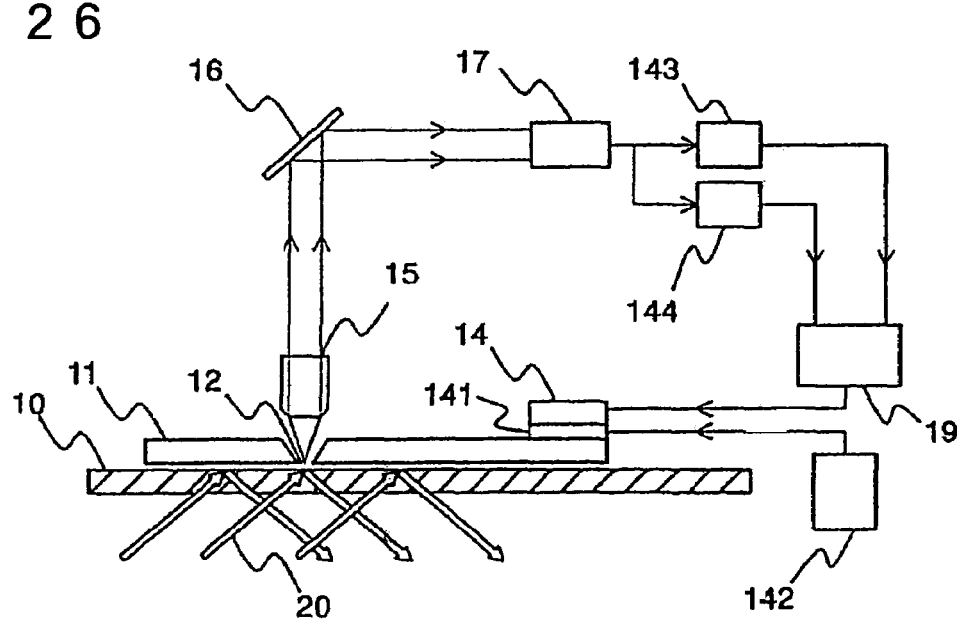
FIG. 26 is a block diagram showing a schematic structure of a recording apparatus according to Embodiment 11.

FIG. 26 is a block diagram showing a schematic structure of a recording apparatus according to Embodiment 11. Incidentally, the parts common to those of FIG. 1 are attached by the same reference characters. In FIG. 26, a fine vibration drive mechanism 141 is provided together with a Z-axis control mechanism 14 on an aperture element 11. The fine-vibration drive mechanism 141 provides a microscopic aperture 12 portion with vertical vibration in such an extent as the step a explained in Embodiment 5, and operates according to a fine-drive signal sent from a fine-drive signal generating mechanism 142.

The near-field light created on the surface of the recording medium 10 due to laser light 20 illumination is scattered by the microscopic aperture 12 placed in proximity thereto. The propagation light created due to scattering is introduced to the focusing optical system 15 through the microscopic aperture 12 and then conducted to the light detecting mechanism 17 through the mirror 16. On this occasion, the microscopic aperture 12 is vertically being vibrated by the fine-vibration drive mechanism 141. Because the near-field light to be scattered is different in intensity at between an uppermost point and lowermost point given with respect to the surface of the recording medium 10, an electric signal to be outputted from the light detecting mechanism 17 also represents a corresponding change of intensity to the vibration of the aperture element 11.

Here, a signal to be correspondingly outputted from the light detecting mechanism 17 to a desired height of the microscopic aperture 12, e.g. a time point of positioned at the lowermost point, is a signal corresponding to the most intense neat field light created on the surface of the recording medium 10. Accordingly, this signal is extracted as a reproduced signal by a reproduced signal detecting mechanism 143 and sent to the control mechanism 19. Also, a signal to be correspondingly outputted from the light detecting mechanism 17 to an above point of the desired height of the microscopic aperture 12, e.g. a time point of positioned at the uppermost point, is extracted as a to-be-operated signal by a to-be-operated signal detecting mechanism 144 and sent to the control mechanism 19.

Incidentally, the detection of signals by the reproduced signal detecting mechanism 143 and to-be-operated signal detecting mechanism 144 can be made simultaneously with detection of a fine-drive signal to be outputted from the fine-drive signal generation mechanism 142.

The control mechanism 19 is inputted by a reproduced signal and to-be-operated signal and calculates a relative ratio as stated above, thus creating a distance control signal. The distance control signal is sent to the Z-axis control mechanism 14. Thus, proximity control of the aperture element 11 is achieved due to the Z-axis control mechanism 14.

Figure 27:
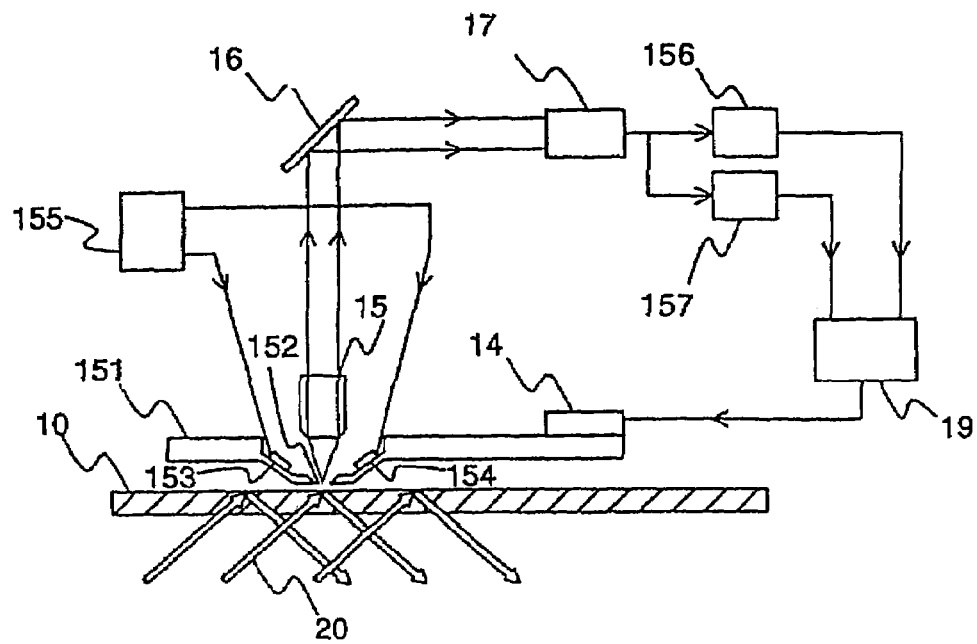
FIG. 27 is a block diagram showing another example of the recording apparatus according to Embodiment 11.

FIG. 27 is a block diagram showing another embodiment of a recording apparatus which creates a reproduced signal and distance control signal due to vibration of one microscopic aperture. Incidentally, the parts common to those of FIG. 1 are attached by the same reference characters. In FIG. 27, on the aperture element 151 a portion sufficient smaller in thickness than the flat-surface substrate as a base member or the aperture element 151 is projected downward. The projected portion is provided with a microscopic aperture 152. Furthermore, fine-vibration drive elements 153 and 154 are provided at an upper surface of an edge of the microscopic aperture 152. A z-axis control mechanism 14 is provided on the aperture element 151. The fine-vibration drive elements 153 and 154 provide vertical vibration to a microscopic aperture 152 portion in such an extent as the step a explained in Embodiment 10, and operate according to a fine-drive signal sent from the fine-drive signal generating mechanism 155.

The near-field light created on the surface of the according medium 10 due to illumination of laser light 20 is scattered by the microscopic aperture 152 positioned in proximity thereto. The propagation light created by the scattering is introduced to the focusing optical system 15 through the microscopic aperture 152, and then conducted to the light detecting mechanism 17 through the mirror 16. On this occasion, the microscopic aperture 152 is vertically vibrating due to the fine-vibration drive elements 153 and 154. Because the near-field light to be scattered is different in intensity at between an uppermost point and lowermost point given with respect to the surface of the recording medium 10, an electric signal to be outputted from the light detecting mechanism 17 also exhibits a corresponding change of intensity to vibration of the aperture element 11.

Here, similarly to the recording apparatus shown in FIG. 26, a signal to be correspondingly outputted from the light detecting mechanism 17 to a desired height of the microscopic aperture 152, e.g. a time point of positioned at the lowermost point, is a signal corresponding to the most intense near-field light created on the surface of the recording medium 10. Accordingly, this signal is extracted as a reproduced signal by a reproduced signal detecting mechanism 156 and sent to the control mechanism 19. Also, a signal to be correspondingly outputted from the light detecting mechanism 17 to an above point of the desired height of the microscopic aperture 152, e.g. a time point of positioned at the uppermost point, is extracted as a to-be-operated signal by a to-be-operated signal detecting mechanism 157 and sent to the control mechanism 19. Incidentally, the detection of signals by the reproduced signal detecting mechanism 156 and to-be-operated signal detecting mechanism 157 can be made simultaneously with detection of a fine-drive signal to be outputted from the fine-drive signal generating mechanism 155.

The control mechanism 19 is inputted by a reproduced signal and to-be-operated signal and calculates a relative ratio as stated above, thus creating a distance control signal. The distance control signal is sent to the Z-axis control mechanism 14. Thus, proximity control of the aperture element 151 is achieved due to the Z-axis control mechanism 14.

Accordingly, the position at which near-field light is to be scattered is changed by vertically vibrating one microscopic aperture. A signal detected at a desired height, e.g. an lowermost point, of the microscopic aperture, i.e. a reproduced signal and signal detected at an upper point, i.e. an uppermost point, than the desired height of the microscopic aperture have a relative value used as a distance control signal for conducting proximity control of the aperture element. Consequently, even where for example an intense reproduced signal cannot be obtained due to insufficient detection of information on the recording medium, a distance control signal is obtainable as a ratio to a reproduced signal with stable intensity. Thus, proximity control of the aperture element is feasible with reliability.

EMBODIMENT 12

Next, explained is a recording apparatus according to Embodiment 12. The recording apparatus according to Embodiment 12 is characterized in that, when information reproduction is made using the recording apparatus according to Embodiment 1, 2 and 8-11 on an information unit recorded in a given regulated arrangement (track) on the recording medium, made possible is positioning control, or tracking control, to accurately arranging an information unit at a position beneath the microscopic aperture.

Here, explanation will be made particularly on a recording apparatus providing various mechanisms for tacking control to the structure having the photodetector 61 shown in FIG. 17 provided at each microscopic aperture 101 shown in FIG. 20.

Figure 28:
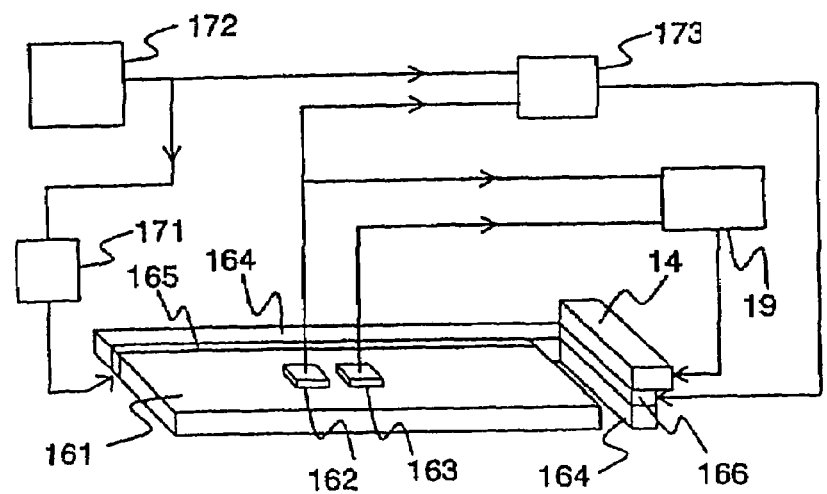
FIG. 28 is a block diagram showing a schematic structure of a recording apparatus according to Embodiment 12.

FIG. 28 is a block diagram showing a schematic structure of a recording apparatus according to Embodiment 12. Incidentally, the parts common to those of FIG. 1 are attached with the same reference characters. In FIG. 28, an aperture element 161 is supported by an aperture element fixing mechanism 164 sandwiching a fine-vibration mechanism 165. On the aperture element fixing mechanism 164 a tracking mechanism 166 is provided together with a Z-axis control mechanism 14. Photodetectors 162, 163 are respectively provided above two microscopic aperture (not shown) provided in the aperture element 161 so that a reproduced signal stated above is detected by the photodetector 162.

The fine-vibration mechanism 165 is caused by a fine-vibration drive mechanism 171 to finely vibrate the aperture element 161 in a direction perpendicular to a direction of information unit arrangement (track direction) and a direction parallel with the recording medium surface on the recording medium. The fine-vibration drive mechanism 171 performs driving by inputted by a fine-vibration signal from the fine-vibration signal generating mechanism 172.

Here, in a state that the microscopic aperture for reproduced signal detection is positioned on a track of the information recording medium, the reproduced signal outputted from the photodetector 162 exhibits high intensity. However, in a state that the microscopic aperture for reproduced signal detection is deviated off a track, the reproduced signal outputted from the photodetector 162 exhibits low intensity. Accordingly, the reproduced signal to be outputted from the photodetector 162 is also changed in intensity depending on vibration of the aperture element 161 due to the above-stated fine-vibration mechanism 165.

The signals outputted from the photodetectors 162 and 163 are both inputted to the control mechanism 19 to effect information reproduction in accord with a reproduced signal as well as proximity control responsive to a distance control signal. The reproduced signal outputted from the photodetector 162 is also inputted together with the fine-vibration signal reproduce signal outputted from a fine-vibration signal generating mechanism 172. The tracking control mechanism 173 creates a tracking signal to position the microscopic aperture on a track of the information recording medium by synchronously detecting a reproduced signal and fine-vibration signal, and sends the tracking signal to a tracking mechanism 166. That is, the tracking signal represents a deviation in vibration position between a reproduced signal in a vibration center of a fine-vibration signal and a reproduced signal representing a maximum value over vibration given by the fine-vibration signal.

The tracking mechanism 166 causes the aperture element 161 to displace in response to an input tracking signal. This achieves tracking control of the aperture element 161. Thus, it is possible to keep the microscopic aperture on the track and obtain a preferred reproduced signal.

Accordingly, tracking control is possible to the track on a recording medium. Because this tracking control provides a further stable reproduced signal, proximity control utilizing such a reproduced signal is also rendered possible.

Incidentally, in Embodiments 1, 2 and 8-12, laser light used to create near-field light must not be coherent light. An LED or the like for incoherent light may be used. Furthermore, the fine-vibration mechanism or fine-vibration element for finely vibrating the aperture element uses a fine displacement mechanism such as a piezoelectric actuator, electrostatic actuator or the like.

The invention claimed is:

1. A recording apparatus for reproducing information recorded on a recording medium by utilizing near-field light, the recording apparatus, comprising:

an aperture element having a microscopic aperture to create or scatter near-field light;

light illuminating means for illuminating illumination light to the recording medium such that near-field light is created on a surface of the recording medium;

light detecting means for detecting propagation light caused by scattering the near-field light by the microscopic aperture;

vertical vibrating means for vibrating the aperture element in a thickness direction thereof; and control means for rendering as a reproduced signal a signal detected by the light detecting means when the microscopic aperture reaches a desired height due to the vertical vibrating means and as a to-be-operated signal a signal detected by the light detecting means when the microscopic aperture reaches a point above the desired height due to the vertical vibrating means, and calculating a relative value of the reproduced signal and the to-be-operated signal to control a spacing between the aperture element and the recording medium based on the relative value.

2. A recording apparatus for reproducing or recording information recorded on a recording medium by utilizing near-field light, the recording apparatus, comprising:

an aperture element having a microscopic aperture to create or scatter near-field light;

light illuminating/recording means for introducing illumination light to the microscopic aperture such that near-field light is created in the microscopic aperture;

light detecting means for detecting propagation light caused by scattering the near-field light by the microscopic aperture;

vertical vibrating means for vibrating the aperture element in a thickness direction thereof; and control means for rendering as a reproduced signal a signal detected by the light detecting means when the microscopic aperture reaches a desired height due to the vertical vibrating means and as a to-be-operated signal a signal detected by the light detecting means when the microscopic aperture reaches a point above the desired height due to the vertical vibrating means, and calculating a relative value of the reproduced signal and the to-be-operated signal to control a spacing between the aperture element and the recording medium based on the relative value.

3. A recording apparatus for reproducing or recording information recorded on a recording medium by utilizing near-field light, the recording apparatus, comprising:

an aperture element having two microscopic apertures to create or scatter near-field light, the aperture element having a step in a thickness direction thereof to define a first bottom surface and a second bottom surface, the first bottom surface being provided with one of the microscopic apertures, and the second bottom surface being provided with the other of the microscopic apertures;

light illuminating means for illuminating illumination light to the recording medium such that near-field light is created on a surface of the recording medium;

first light detecting means for detecting propagation light caused by scattering the near-field light by one of the microscopic apertures and converting the detected propagation light into a reproduced signal;

second light detecting means for detecting propagation light caused by scattering the near-field light by the other of the microscopic apertures and converting the detected propagation light into a control signal; and control means for calculating a relative value of the reproduced signal detected by the first light detecting means and the signal detected by the second light detecting means, and controlling the spacing between the aperture element and the recording medium based on the relative value.

4. A recording apparatus for reproducing or recording information recorded on a recording medium by utilizing near-field light, the recording apparatus, comprising:

an aperture element having two microscopic apertures to create or scatter near-field light, the aperture element having a step in a thickness direction thereof to define a first bottom surface and a second bottom surface, the first bottom surface being provided with one of the microscopic apertures, and the second bottom surface being provided with the other of the microscopic apertures;

first light illuminating means for illuminating illumination light to the recording medium such that near-field light is created on a surface of the recording medium;

second light illuminating/recording means for illuminating illumination light to one of the microscopic apertures such that near-field light is created in the microscopic aperture;

first light detecting means for detecting propagation light caused by scattering the near-field light by one of the microscopic apertures and converting the detected propagation light into a reproduced signal;

second light detecting means for detecting propagation light caused by scattering the near-field light by the other of the microscopic apertures and converting the detected propagation light into a control signal; and control means for calculating a relative value of the reproduced signal detected by the first light detecting means and the signal detected by the second light detecting means, and controlling the spacing between the aperture element and the recording medium based on the relative value.

5. A recording apparatus for reproducing or recording information recorded on a recording medium by utilizing near-field light, the recording apparatus, comprising:

an aperture element having two microscopic apertures to create or scatter near-field light, the aperture element having a step in a thickness direction thereof to define a first bottom surface and a second bottom surface, the first bottom surface being provided with one of the microscopic apertures, and the second bottom surface being provided with the other of the microscopic apertures;

light illuminating/recording means for introducing illumination light to one of the microscopic apertures such that near-field light is created in the microscopic aperture;

light illuminating means for introducing illumination light to the other of the microscopic apertures such that near-field light is created in the microscopic aperture;

first light detecting means for detecting propagation light caused by scattering the near-field light by one of the microscopic apertures and converting the detected propagation light into a reproduced signal;

second light detecting means for detecting propagation light caused by scattering the near-field light by the other of the microscopic apertures and converting the detected propagation light into a control signal; and control means for calculating a relative value of the reproduced signal detected by the first light detecting means and the signal detected by the second light detecting means, and controlling the spacing between the aperture element and the recording medium based on the relative value.

6. A recording apparatus for reproducing or recording information recorded on a recording medium by utilizing near-field light, the recording apparatus, comprising:

an aperture element having two microscopic apertures to create or scatter near-field light, the aperture element having a step in a thickness direction thereof to define a first bottom surface and a second bottom surface, the first bottom surface being provided with one of the microscopic apertures, and the second bottom surface being provided with the other of the microscopic apertures;

light illuminating/recording means for introducing illumination light to one of the microscopic apertures such that near-field light is created in the microscopic aperture;

light illuminating means for illuminating illumination light to the other of the microscopic apertures such that near-field light is created in the microscopic aperture;

first light detecting means for detecting propagation light caused by scattering the near-field light by one of the microscopic apertures and converting the detected propagation light into a reproduced signal;

second light detecting means for detecting propagation light caused by scattering the near-field light by the other of the microscopic apertures and converting the detected propagation light into a control signal; and control means for calculating a relative value of the reproduced signal detected by the first light detecting means and the signal detected by the second light detecting means, and controlling the spacing between the aperture element and the recording medium based on the relative value.

7. A recording apparatus according to claim 3; further comprising horizontal vibrating means for causing the aperture element to vibrate in a direction perpendicular to a direction of arrangement of information units recorded on the recording medium and a direction parallel with a surface of the recording medium; and position control means for controlling a position of the aperture element such that the reproduced signal becomes a maximum in a vibration center of vibration due to the horizontal vibrating means.

8. A recording apparatus according to claim 4; further comprising horizontal vibrating means for causing the aperture element to vibrate in a direction perpendicular to a direction of arrangement of information units recorded on the recording medium and a direction parallel with a surface of the recording medium; and position control means for controlling a position of the aperture element such that the reproduced signal becomes a maximum in a vibration center of vibration due to the horizontal vibrating means.

9. A recording apparatus according to claim 5; further comprising horizontal vibrating means for causing the aperture element to vibrate in a direction perpendicular to a direction of arrangement of information units recorded on the recording medium and a direction parallel with a surface of the recording medium; and position control means for controlling a position of the aperture element such that the reproduced signal becomes a maximum in a vibration center of vibration due to the horizontal vibrating means.

10. A recording apparatus according to claim 6; further comprising horizontal vibrating means for causing the aperture element to vibrate in a direction perpendicular to a direction of arrangement of information units recorded on the recording medium and a direction parallel with a surface of the recording medium; and position control means for controlling a position of the aperture element such that the reproduced signal becomes a maximum in a vibration center of vibration due to the horizontal vibrating means.

11. A recording apparatus according to claim 1; further comprising horizontal vibrating means for causing the aperture element to vibrate in a direction perpendicular to a direction of arrangement of information units recorded on the recording medium and a direction parallel with a surface of the recording medium; and position control means for controlling a position of the aperture element such that the reproduced signal becomes a maximum in a vibration center of vibration due to the horizontal vibrating means.

12. A recording apparatus according to claim 2; further comprising horizontal vibrating means for causing the aperture element to vibrate in a direction perpendicular to a direction of arrangement of information units recorded on the recording medium and a direction parallel with a surface of the recording medium; and position control means for controlling a position of the aperture element such that the reproduced signal becomes a maximum in a vibration center of vibration due to the horizontal vibrating means.

* * * * *